(12) United States Patent
Gritter et al.

(10) Patent No.: US 10,489,074 B1
(45) Date of Patent: Nov. 26, 2019

(54) ACCESS RATE PREDICTION IN A HYBRID STORAGE DEVICE

(71) Applicant: Tintri by DDN, Inc., Chatsworth, CA (US)

(72) Inventors: Mark G. Gritter, Eagan, MN (US); Hong Wang, Sunnyvale, CA (US)

(73) Assignee: Tintri by DDN, Inc., Chatsworth, CA (US)

( * ) Notice: Subject to any disclaimer, the term of this patent is extended or adjusted under 35 U.S.C. 154(b) by 121 days.

(21) Appl. No.: 15/693,245

(22) Filed: Aug. 31, 2017

Related U.S. Application Data

(60) Provisional application No. 62/448,255, filed on Jan. 19, 2017.

(51) Int. Cl.
*G06F 3/06* (2006.01)

(52) U.S. Cl.
CPC .......... *G06F 3/0631* (2013.01); *G06F 3/0611* (2013.01); *G06F 3/0664* (2013.01); *G06F 3/0685* (2013.01)

(58) Field of Classification Search
CPC .... G06F 3/0631; G06F 3/0611; G06F 3/0685; G06F 3/0664
See application file for complete search history.

(56) References Cited

U.S. PATENT DOCUMENTS

| | | | |
|---|---|---|---|
| 6,314,465 B1 * | 11/2001 | Paul | H04L 67/1008 709/217 |
| 9,135,033 B1 | 9/2015 | Lee | |
| 2011/0010514 A1 * | 1/2011 | Benhase | G06F 3/061 711/162 |
| 2012/0036327 A1 * | 2/2012 | Jennas, II | G06F 3/0613 711/137 |
| 2012/0185851 A1 | 7/2012 | Zhang | |
| 2012/0272237 A1 | 10/2012 | Baron | |
| 2013/0097601 A1 | 4/2013 | Podvratnik | |
| 2013/0238780 A1 | 9/2013 | Devarakonda | |
| 2014/0250439 A1 | 9/2014 | Parashar | |
| 2016/0070601 A1 | 3/2016 | Yamamoto | |
| 2016/0070602 A1 * | 3/2016 | Shimogawa | G06F 9/45558 718/1 |
| 2017/0060611 A1 | 3/2017 | Birkestrand | |
| 2018/0139100 A1 | 5/2018 | Nagpal | |

OTHER PUBLICATIONS

Jianhai et al., Affinity-Aware Grouping for Allocation of Virtual Machines, 2013, 2013 IEEE 27th International Conference on Advanced Information Networking and Applications, pp. 235-242 (Year: 2013).

* cited by examiner

*Primary Examiner* — Francisco A Grullon
(74) *Attorney, Agent, or Firm* — Van Pelt, Yi & James LLP

(57) ABSTRACT

Access rate prediction in a hybrid storage device is disclosed, including: using a first tier type of storage access counts to model an access distribution across a first tier type of storage and a second tier type of storage at a storage device; and generating a predicted first tier type of storage hit rate that is predicted to result from moving an existing VM off of the storage device using access statistical information associated with the existing VM and the access distribution at the storage device.

21 Claims, 23 Drawing Sheets

ACCESS RATE PREDICTION IN A HYBRID STORAGE DEVICE

CROSS REFERENCE TO OTHER APPLICATIONS

This application claims priority to U.S. Provisional Patent Application No. 62/448,255 entitled FLASH MISS RATE PREDICTION IN A HYBRID STORAGE SYSTEM filed Jan. 19, 2017 which is incorporated herein by reference for all purposes.

BACKGROUND OF THE INVENTION

A storage device may have multiple tiers of storage. Each tier of storage may include a storage type and/or may be designated to store data that meets the criteria associated with being stored in that tier of storage. For example, different tiers of storage may be designated to store data that is associated with different frequencies of access and/or priorities. For example, a storage type that is associated with a higher tier may have more desirable attributes (e.g., faster accesses) than a storage type that is associated with a lower tier. As such, a storage type that is associated with a higher tier may be used for storing data that is relatively more frequently accessed (e.g., through either reads or writes) and/or data that is designated to be of a higher priority.

BRIEF DESCRIPTION OF THE DRAWINGS

Various embodiments of the invention are disclosed in the following detailed description and the accompanying drawings.

DETAILED DESCRIPTION

Figure 1:
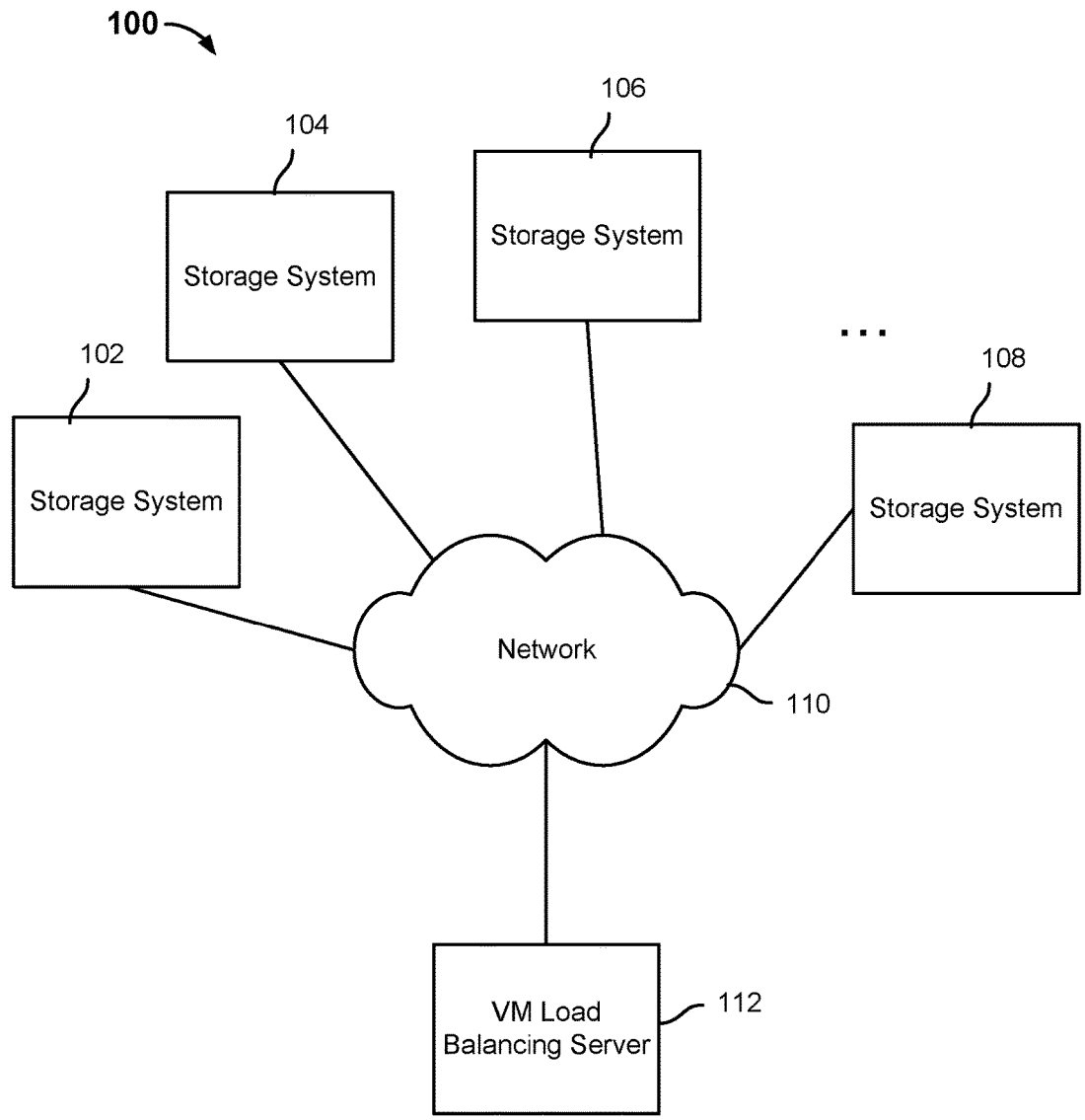
FIG. 1 is a diagram showing an embodiment of a system for performing load balancing using predictive analytics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments, a "hybrid storage device" comprises a storage device that includes more than one tier of storage. In various embodiments, each tier of storage comprises a different type of storage. In various embodiments, the hybrid storage device comprises a Solid State Drive (SSD or "flash") and Hard Disk Drive (HDD or "disk"). In various embodiments, due to flash having more desirable attributes than disk (e.g., flash provides relatively faster accesses than disk), typically flash is used by the storage device as the higher tier storage and the disk is used by the storage device as the lower tier storage. In some embodiments, only data that meets the criteria associated with being able to be stored in flash is moved into (which is also sometimes referred to as being "promoted" into) flash and data that does not (e.g., or no longer) meet such criteria is moved out of flash (which is also sometimes referred to as being "evicted" from flash) and stored onto disk. An example criterion for being stored in flash is being relatively more frequently accessed than other blocks of data. In various embodiments, data of virtual machines (VMs) that resides at a storage device is stored in either or both of the flash storage and the disk storage of that storage device. In various embodiments, in response to a given operation (e.g., a read or a write), flash is first checked for the relevant data and if the relevant data is not found, disk is used to complete the operation. An access to satisfy an operation that is able to locate relevant data in flash is referred to as a "flash hit" and an access to satisfy an operation that is not able to locate relevant data in flash is referred to as a "flash miss." An access associated with a "flash miss" then checks the disk at the storage device for the relevant data.

Due to the faster accesses provided by flash over disk, it is desirable to maintain as much VM data in flash as possible. As such, flash in the storage device is often entirely (e.g., up to the maximum percentage of flash that is configured/allocated for storing VM data) consumed with VM data, while the remaining VM data that cannot be stored in flash is stored on disk. It is also desirable to maintain a high as possible flash hit rate such that operations (e.g., reads or writes) to the storage device may be serviced by the faster of the two tiers of storage. In various embodiments, the "flash hit rate" refers to the percentage of accesses at the storage device that are able to be satisfied by the data stored at flash. Each VM in a storage device needs a certain amount of its data in flash in order to maintain a high flash hit rate at the storage device. In some embodiments, this amount of flash is referred to as a VM's "working set." However, when data on flash is mostly consumed by certain VMs at a storage device, the data of other VMs may be excluded from flash entirely or only a small portion thereof is able to be stored on flash. As a result, the flash hit rate at the storage device may suffer.

When a VM is moved from one storage device to another, the remaining VMs on the source storage device will be able to use more flash and the VMs on the destination storage device will be able to use less flash. It is desirable to estimate how potential VM migrations between storage devices impact the flash hit rate of the source and destination storage devices. For example, a VM may be load balanced from its source storage device to another storage device in an effort to improve the flash hit rate at the source storage device.

Embodiments of predicting access rates in a hybrid storage device are described herein. A first tier type of storage access counts is used to model an access distribution across the first tier type of storage and a second tier type of storage at a storage device. A predicted first tier type of storage hit rate as a result of moving a VM off of the storage device is generated using access statistical information associated with the VM. In some embodiments, a predicted access first tier type of storage hit rate (e.g., a flash hit rate) as a result of a new VM being added to the storage device may also be generated using access statistical information associated with the new VM. For purposes of illustration, most examples described below will refer to the first tier type of storage as comprising flash and the second tier type of storage as comprising disk.

In some embodiments, a storage device is included with at least one other storage device in a "pool" of storage devices. Storage devices that are included in the same pool may have at least one common attribute (e.g., the storage devices are located in the same geographic area). A storage device specific predicted metric data structure is determined for each storage device, where at least some of the predicted metrics of the data structure are associated with the flash hit rate at each storage device, and then the device specific predicted metric data structures corresponding to the storage devices that are associated with the same pool are combined to determine a combined, pool-level predicted metric data structure. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices. In some embodiments, the predicted flash hit rate as a result of moving a VM off of the storage device is used to determine whether the VM should be moved off the storage device in a load balancing process that attempts to improve at least one predicted metric of the combined, pool-level predicted metric data structure. In some embodiments, the predicted flash hit rate predicted to result from moving a VM off of the storage device is used to determine whether the VM should be moved off the storage device in a load balancing process that attempts to improve at least one predicted metric of the combined, pool-level predicted metric data structure. Similarly, in some embodiments, the predicted flash hit rate as a result of moving a VM onto the storage device is used to determine whether the VM should be moved onto the storage device in a load balancing process that attempts to improve at least one predicted metric of the combined, pool-level predicted metric data structure. In some embodiments, the predicted flash hit rate predicted to result from moving a VM onto the storage device is used to determine whether the VM should be moved onto the storage device in a load balancing process that attempts to improve at least one predicted metric of the combined, pool-level predicted metric data structure.

FIG. 1 is a diagram showing an embodiment of a system for performing load balancing using predictive analytics. In the example, system 100 includes storage device 102, storage device 104, storage device 106, network 110, storage device 108, and VM load balancing server 112. In various embodiments, network 110 includes various high-speed data networks and/or telecommunications networks. In various embodiments, system 100 includes storage device 102, storage device 104, storage device 106, storage device 108, and VM load balancing server 112 communicate with each other over network 110. In the example, each of storage device 102, storage device 104, storage device 106, and storage device 108 store data related to one or more VMs for which data is currently stored on the respective storage device. Each of storage device 102, storage device 104, storage device 106, and storage device 108 is configured to store historical data at different historical points in time with respect to the VMs that are currently and/or have previously resided at that storage device. In some embodiments, VM load balancing server 112 is configured to keep track of which VMs currently reside at which storage device. In some embodiments, a VM may have data stored at different storage devices and are referred to as "multi-component VMs." In some embodiments, VM load balancing server 112 is configured to store aggregated historical data associated with a multiple-component VM.

At least two of storage device 102, storage device 104, storage device 106, and storage device 108 may be defined by a user to be included in the same pool of storage devices. In various embodiments, a pool of storage devices comprises storage devices that share at least one common attribute (e.g., are located with the same geographic area and/or are owned by the same entity). VM load balancing server 112 is configured to obtain historical data corresponding to various VMs from the storage devices at which the VMs reside and use the historical data to generate predicted metrics for each storage device based on the historical VM data obtained from that storage device. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices and/or an event that is to trigger load balancing of VMs among storage devices of the pool. For example, the historical VM data from the past 30 days may be used to generate a metric within the subsequent seven days. In various embodiments, a user configurable/tunable historical window of time associated with historical VM data may be used to make a predicted metric within a user configurable/tunable future window of time. VM load balancing server 112 is configured to include the predicted metrics generated for each storage device into a data structure that corresponds to that storage device. In some embodiments, the data structure is a vector. In various embodiments, VM load balancing server 112 is configured to include the predicted metrics generated for each storage device into a corresponding data structure such that the position of each predicted metric corresponds to a priority associated with that particular metric type. For example, the predicted metric associated with the highest priority metric type is stored in the first position in the vector, the predicted metric associated with the second highest priority metric type is stored in the second position in the vector, and so forth.

After VM load balancing server 112 has generated a storage device specific predicted metric data structure for each storage device in a pool, VM load balancing server 112 is configured to combine the storage device specific predicted metric data structures associated with the storage devices in the pool into a combined, pool-level predicted metric data structure. For example, storage device 102, storage device 104, storage device 106, and storage device 108 are included in the same pool and so VM load balancing server 112 has generated a storage device specific predicted metric data structure corresponding to each of storage device 102, storage device 104, storage device 106, and storage device 108. Then, VM load balancing server 112 is configured to combine the storage device specific predicted metric data structure corresponding to each of storage device 102, storage device 104, storage device 106, and storage device 108 together to determine a combined, pool-level predicted metric data structure. In various embodiments, combining the storage device specific predicted metric data structures associated with the storage devices in the pool into the combined, pool-level predicted metric data structure includes determining the joint probability of all predicted metrics associated with the same metric type across the storage device specific predicted metric data structures as the combined, pool-level predicted metric for the same metric type. As such, each combined predicted metric of the combined predicted metric data structure represents the predicted probability that the event of the corresponding metric type will happen at any point to any storage device in the pool in a configured window of time in the future.

VM load balancing server 112 will identify one or more predicted metrics within the combined predicted metric data structure that are to be improved. In various embodiments, one or more predicted metrics are determined to be improved by comparing those values to one or more respective threshold values. Similar to predicted metrics, a threshold value can either be a single value or a range of values. For example, if a combined predicted metric is greater than a threshold value associated with the corresponding metric type, then the combined predicted metric is determined to be improved. For example, the combined predicted metric that is to be improved may be a probability (e.g., 78%) that any storage device in the pool is to exceed 98% of its space capacity in the next seven days (e.g., or whichever user configured window of time in the future) exceeding a corresponding threshold value (e.g., 70%).

VM load balancing server 112 is configured to use each combined, pool-level predicted metric that is identified to be improved to select one or more VMs to move/migrate from their current/source storage devices within the pool to a different destination storage device within the pool. Moving the one or more VMs from their current/source storage devices within the pool to a different destination storage device within the pool is predicted to improve at least the identified combined, pool-level predicted metric that is identified to be improved. In the event that a combined, pool-level predicted metric is defined to be a probability that an undesirable event will happen to any storage device within the pool at any time in a configured window of time in the future, "improving" that combined predicted metric includes lowering the probability that the undesirable event will happen (e.g., to be below the threshold value corresponding to that metric type). In various embodiments, it is predicted that moving the one or more VMs from their current/source storage devices within the pool to a different destination storage device within the pool will improve the identified combined, pool-level predicted metric that is identified to be improved based on computing a updated combined, pool-level predicted metric data structure based on a hypothetical ("what-if") scenario in which the historical data of the one or more VMs are removed from their current/source storage device and instead assumed to be already stored at the destination storage device. In some embodiments, VM load balancing server 112 is configured to determine one or more sets of VMs to move to respective destination storage devices within the pool to potentially improve each combined, pool-level predicted metric that is selected to be improved. In some embodiments, VM load balancing server 112 is configured to present the determined sets of VMs and their respective destination storage devices the sets of VMs are determined to move to as one or more recommendations for a user to approve. For example, each recommendation identifies which VMs to move, the source storage devices of the VMs, the destination storage devices of the VMs, and the metric type that the VM migrations are predicted to improve. In response to a user selection to approve a recommendation, VM load balancing server 112 is configured to initiate the migration of the data of the VMs included in the recommendation from their respective source storage device(s) to their destination storage device. In some embodiments, a recommendation may be automatically implemented without any user input/approval. In some embodiments, the actual migration of VM data from one storage device to another may be performed by a hypervisor and/or the source storage device and/or the destination storage device.

In some embodiments, after a recommendation is implemented (i.e., VMs included in the recommendation are migrated between storage devices in the pool), the historical data associated with migrated VMs will be removed from their former/source storage devices and then added to the aggregated historical VM data of their current/destination storage devices such that subsequently generated predicted metrics may be computed based on historical data of only VMs that are actually residing at each storage device. In various embodiments, "aggregated historical VM data" refers to the combination (e.g., sum or other combination) of historical data across one or more VMs that reside at a storage device. In various embodiments, the modified historical data of VMs stored at a storage device is referred to as the "effective" historical data (as opposed to "actual" historical data, which refers to historical data associated with even VMs that do not currently reside at a certain storage device). As such and as will be described in further details below, the aggregated historical data of VMs that is stored at each storage device and used for making predicted metrics comprises aggregated "effective" historical data.

Figure 2:
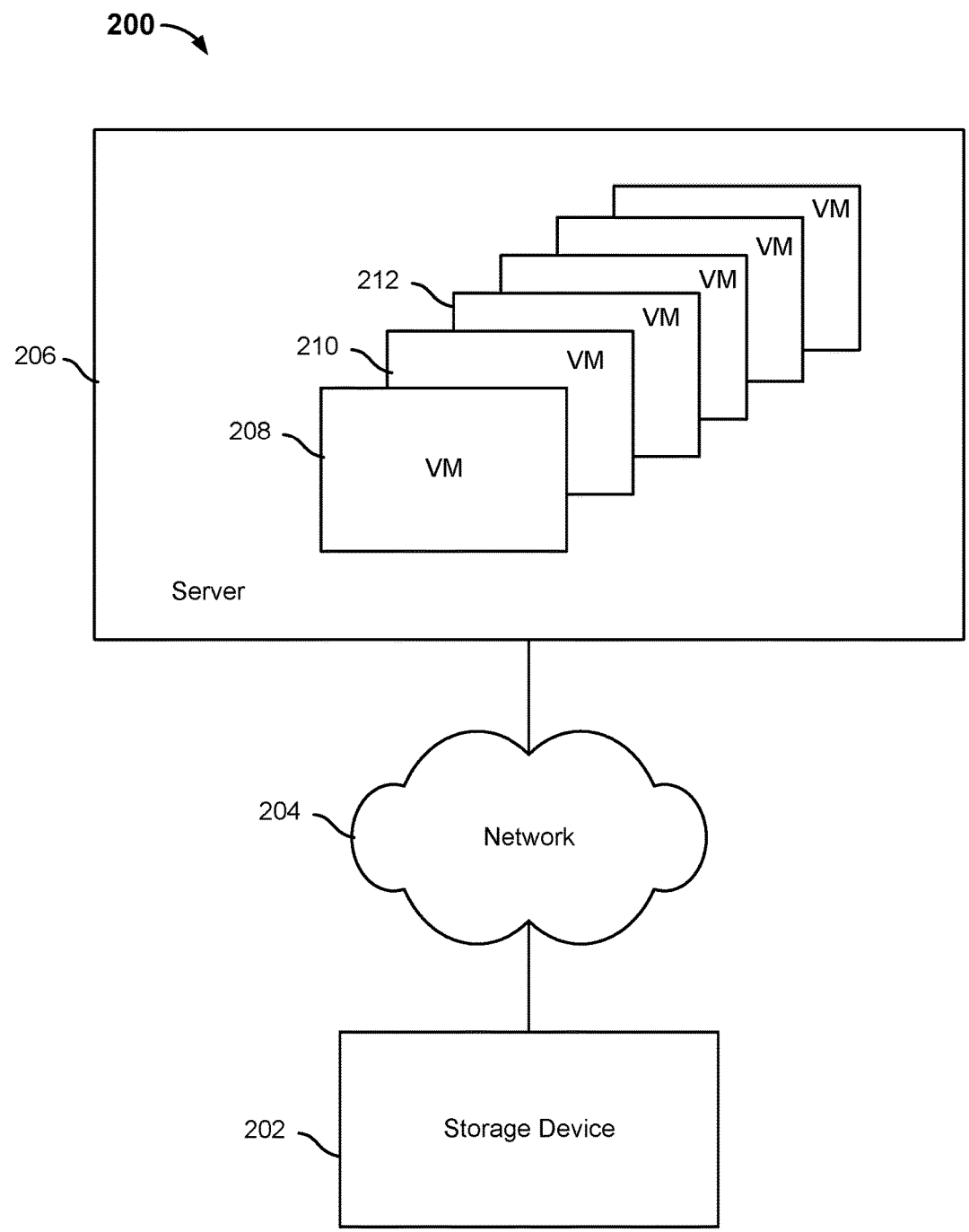
FIG. 2 is a diagram showing an embodiment of a storage device for the storage of VMs using virtual machine storage abstractions.

FIG. 2 is a diagram showing an embodiment of a storage device for the storage of VMs using virtual machine storage abstractions. In the example shown, system 200 includes server 206, network 204, and storage device 202. In various embodiments, network 204 includes various high-speed data networks and/or telecommunications networks. In some embodiments, storage device 202 communicates with server 206 via network 204. In some embodiments, the file system for the storage of VMs using VM storage abstractions does not include network 204, and storage device 202 is a component of server 206. In some embodiments, server 206 is configured to communicate with more storage systems other than storage device 202. Each of storage devices 102, 104, 106, and 108 of system 100 of FIG. 1 may be implemented using a storage device such as storage device 202 of system 200.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage device as one or more files. In various embodiments, the files are examples of VM storage abstractions. In some embodiments, the respective files associated with (at least) VMs 208, 210, and 212 running on server 206 are stored on storage device 202.

In various embodiments, storage device 202 is configured to store meta-information identifying which stored data objects, such as files or other VM storage abstractions, are associated with which VM or vdisk. In various embodiments, storage device 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage device 202 also stores at least a portion of the files associated with the specific VMs in addition to the mappings to those files. In various embodiments, storage device 202 refers to one or more physical systems and/or associated hardware and/or software components configured to work together to store and manage stored data, such as files or other stored data objects. In some embodiments, a hardware component that is used to (at least in part) implement the storage device may be comprised of one or a combination of multiple tiers of storage types. For example, storage device 202 may include tiers of storage types such as hard disk drive (HDD or "disk") and/or solid state drive (SSD or "flash"). In various embodiments, a type of storage is considered to be in a higher tier if it has faster accesses relative to a type of storage that is considered to be in a lower tier. In various embodiments, the higher tier type of storage (e.g., flash storage) at storage device 202 is configured to store more frequently accessed and/or otherwise higher priority VM data and lower tier type of storage (e.g., disk storage) at storage device 202 is configured to store less frequently accessed and/or otherwise lower priority VM data.

Figure 3:
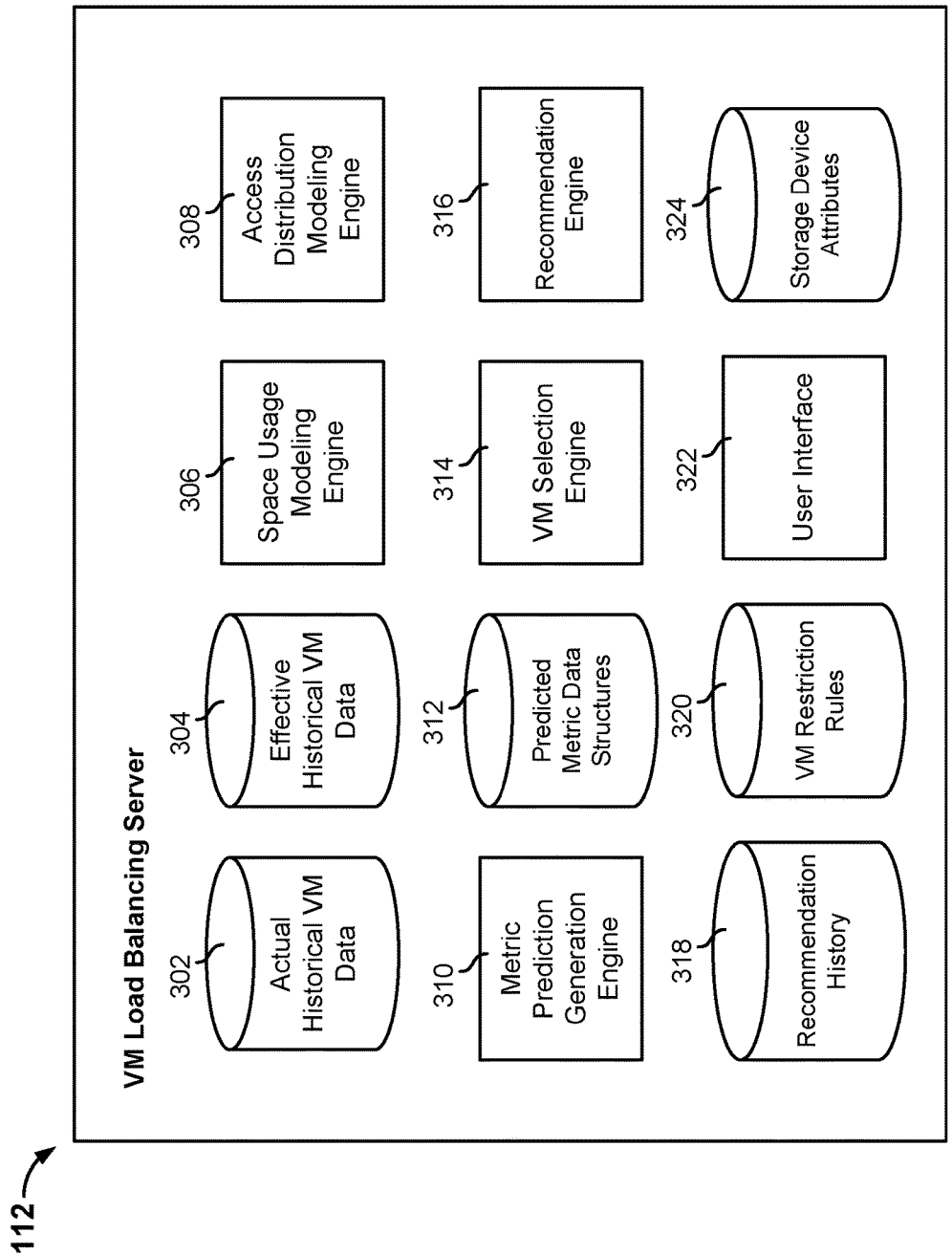
FIG. 3 is a diagram showing an example of a VM load balancing server.

FIG. 3 is a diagram showing an example of a VM load balancing server. In the example VM load balancing server of FIG. 3, the VM load balancing server includes actual historical VM data storage 302, effective historical VM data storage 304, space usage modeling engine 306, access distribution modeling engine 308, metric prediction generation engine 310, predicted metric data structures storage 312, VM selection engine 314, recommendation engine 316, recommendation history storage 318, VM restriction rules storage 320, user interface 322, and storage device attributes 324. In some embodiments, space usage modeling engine 306, access distribution modeling engine 308, metric prediction generation engine 310, VM selection engine 314, recommendation engine 316, and user interface 322 may each be implemented using one or both of hardware and/or software. In some embodiments, actual historical VM data storage 302, effective historical VM data storage 304, predicted metric data structures storage 312, recommendation history storage 318, VM restriction rules storage 320, and storage device attributes 324 may be implemented using one or more databases. In various embodiments, a VM load balancing server may include additional, fewer, and/or different components than those described in FIG. 3.

Actual historical VM data storage 302 is configured to store the actual historical VM data of VMs that have previously resided and/or currently reside on a storage device. In various embodiments, the VM load balancing server is configured to generate predicted metrics for storage devices in a pool and then to generate recommendations of which sets of VMs to move from their source storage devices to a destination storage device within the same pool in order to improve a combined, pool-level predicted metric. Examples of actual historical VM data comprise performance attributes (e.g., storage space usage and load), how much of a VM's data is stored in disk versus flash, and/or how many times each VM's block in disk/flash has been accessed. In some embodiments, actual historical VM data storage 302 is configured to store, for each VM, a historical attribute value at each predetermined historical interval for a predetermined length of time. An example historical attribute value is space usage and as such, actual historical VM data storage 302 may store a space usage attribute value corresponding to how much space each VM at the storage device at which it is residing consumes on each day of a window of time in the past. In some embodiments, if a VM has data that is stored across multiple storage devices, then actual historical VM data storage 302 is configured to store the aggregated historical attribute value of the multi-component VMs across the multiple storage devices at each predetermined historical interval for a predetermined length of time. In some embodiments, at least some of the actual historical VM data corresponding to a VM is also stored at each storage device that stores data of that VM.

Effective historical VM data storage 304 is configured to store the effective historical data of VMs that currently reside on a storage device. Examples of effective historical VM data comprise performance attributes (e.g., storage space usage and load) and also how much of a VM's data is stored in disk versus flash and/or how many times each VM's block in disk/flash has been accessed. As mentioned above, after a VM is moved from its source storage device to a destination storage device (e.g., as a result of a user approving a recommendation that includes such a move), the effective historical VM data at each of the source storage device and the destination storage device is updated. At the source storage device, the historical VM data of the migrated VM is removed. For example, if "VM-123" had been moved off of a source storage device and the source storage device had stored a historical space usage attribute value corresponding to "VM-123" at each predetermined historical interval (e.g., day) for a predetermined length of time (e.g., at least 30 days), then the historical space usage attribute value corresponding to "VM-123" would either be discarded from the source storage device or at least indicated to be ignored in making predicted metrics for the source storage device. Similarly, for example, the historical space usage attribute value corresponding to "VM-123" at each predetermined historical interval (e.g., day) for a predetermined length of time that was previously stored at the former source storage device is then added to the destination/current storage device. The purpose of updating the effective historical VM data at the source and destination storage devices after a VM migration is so that the updated effective historical VM data at each storage device could accurately reflect the historical data of VMs that currently reside on the storage device (and not that of VMs that no longer currently reside on the storage device). As such, the effective historical VM data at a storage device may be used to make accurate predicted metrics for the storage device. In some embodiments, at least some of the effective historical VM data corresponding to a VM is also stored at each storage device on which the VM resides.

Space usage modeling engine 306 is configured to generate predicted metrics related to space usage related metric types. In some embodiments, space usage modeling engine 306 is configured to input the effective historical VM data related to space usage at each storage device (e.g., how much aggregated storage space one or more VMs that currently reside at the storage device consume) (e.g., that is stored either at the storage device and/or at effective historical VM data storage 304) from a configured historical window of time (e.g., the past 30 days) into one or more statistical models. In some embodiments, space usage modeling engine 306 is configured to input historical non-VM data related to space usage at each storage device from a configured historical window of time to identify non-VM related space usage trends as well. As such, VMs may be recommended to be moved between storage devices to load balance (e.g., free up storage resources at the source storage devices) even when the VMs themselves may not be the source of space growth. The one or more statistical models use at least a subset of the input effective historical VM data related to space usage to output various predictions of predicted VM space usage for the VM(s) at the storage device (e.g., how much aggregated storage space one or more VMs that currently reside at the storage device is predicted to consume) at any point in time in a configured window of time in the future (e.g., the next seven days). The outputs from the statistical models may be sorted and the sorted distribution of predicted VM space usage at the storage device may be used to generate the predicted metric at the storage device corresponding to one or more space usage related metric types. For example, example space usage related metric types are the probability that 100% of the space at the storage device is predicted to be consumed at any time within the next seven days, the probability that 98% of the space at the storage device is predicted to be consumed at any time within the next seven days, and the probability that 95% of the space at the storage device is predicted to be consumed at any time within the next seven days. In some embodiments, the predicted metric (the probability) corresponding to a space usage related metric type (e.g., the probability that 100% of the space at the storage device is predicted to be consumed at any time within the next seven days) may be a range of probabilities/percentages that is determined by adding and/or subtracting an interval from a single value that is determined from sorted distribution of predicted VM space usage at the storage device.

In some embodiments, space usage modeling engine 306 is configured to generate updated space usage related metric types by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, space usage modeling engine 306 is configured to generate space usage related metric types by using the aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Access distribution modeling engine 308 is configured to generate predicted metrics related to access rate related metric types. In some embodiments, a storage device includes at least a higher tier of storage comprising flash and at least a lower tier of storage comprising disk. In some embodiments, the flash storage is configured to store frequently accessed and/or otherwise higher priority data and the disk storage is configured to store less frequently accessed and/or otherwise lower priority data. In some embodiments, due to the higher cost of flash (or another higher tier of storage associated with faster accesses), the amount of flash in a storage device is limited and typically entirely consumed (e.g., up to the configured allotted/maximum percentage of flash space) for storing VM data. The remaining VM data that is not serviced by flash and/or is evicted from flash at a storage device is stored at disk at the storage device. In some embodiments, the amount of the disk (or another lower tier of storage associated with faster accesses) is less limited than flash and is able to store data that does not meet the criteria for being stored in flash. In some embodiments, access distribution modeling engine 308 is configured to use the aggregated effective historical VM data related to accesses made at flash and disk at each storage device (e.g., how many times each flash block was accessed and how many times disk was accessed) (e.g., that is stored either at the storage device and/or at aggregated effective historical VM data storage 304) from a configured historical window of time (e.g., the past seven days) to model a distribution of flash and disk at the storage device. Access distribution modeling engine 308 is configured to determine a measured "flash hit rate" at the storage device based on the aggregated effective historical VM data (e.g., of the past seven days). In various embodiments, the "flash hit rate" refers to the percentage of accesses at the storage device that were serviced by flash (i.e., the percentage that requested data was found in flash). In various embodiments, the "flash miss rate" refers to the percentage of accesses at the storage device that was serviced by disk (i.e., the percentage that requested data was found in disk). The relationship between the flash hit rate and the flash miss rate is such that their sum is always 1. Example access rate metric types are the maximum between the flash miss rate and 3%, the maximum between the flash miss rate and 1%, and the maximum between the flash miss rate and 0.1%.

In some embodiments, access distribution modeling engine 308 is configured to use the measured flash hit rate and the measured access distribution across flash and disk to determine a prediction parameter (which is sometimes referred to as the "d" parameter) that comprises a probability of access of the most frequently accessed block in disk at the storage device. Then, in modeling the updated access rate related predicted metrics in response to a hypothetical (what-if) addition of a VM to the storage device or the hypothetical removal of a VM from the storage device, in some embodiments, access distribution modeling engine 308 is configured to use the "d" parameter that was previously computed for the storage device to determine the updated flash hit rate (or flash miss rate). In some embodiments, access distribution modeling engine 308 is configured to generate an updated access rate related metric type by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, access distribution modeling engine 308 is configured to generate updated access rate related metric types by using aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Metric prediction generation engine 310 is configured to generate a storage device specific predicted metric data structure corresponding to each storage device. In some embodiments, the storage device specific predicted metric data structure comprises a vector (e.g., a one-dimensional array). In various embodiments, metric prediction generation engine 310 is configured to include/insert the predicted metrics that were generated (e.g., by space usage modeling engine 306 and/or access distribution modeling engine 308) for the storage device in a corresponding storage device specific predicted metric data structure. In various embodiments, metric prediction generation engine 310 is configured to include the predicted metrics in the corresponding storage device specific predicted metric data structure in a manner such that each predicted metric is included in the data structure at a position associated with a priority corresponding to the metric type of that predicted metric. For example, the predicted metric associated with the metric type that is associated with the highest priority is included in the element that is associated with the lowest index/first position of the vector, the predicted metric associated with the metric type that is associated with the second highest priority is included in the element that is associated with the second lowest index/second position of the vector, and so forth. In some embodiments, metric prediction generation engine 310 is configured to store the storage device specific predicted metric data structures at predicted metric data structures storage 312.

Metric prediction generation engine 310 is further configured to combine the storage device specific predicted metric data structure corresponding to each storage device that is associated with a pool of storage devices into a combined, pool-level predicted metric data structure. In some embodiments, the combined, pool-level predicted metric data structure comprises a vector (e.g., a one-dimensional array). In various embodiments, to determine the combined, pool-level predicted metric data structure, metric prediction generation engine 310 is configured to determine the joint probability among the predicted metrics of the same metric type corresponding to the storage device specific predicted metric data structures corresponding to all storage devices of the pool. Metric prediction generation engine 310 is configured to include/insert each joint probability corresponding to each metric type into the combined, pool-level predicted metric data structure at a position associated with a priority corresponding to the metric type. For example, the combined predicted metric (e.g., the joint probability) of the storage device specific predicted metrics associated with the metric type of the highest priority may be included in the element that is associated with the lowest index/first position of the vector, the combined predicted metric of the storage device specific predicted metrics associated with the metric type of the second highest priority may be included in the element that is associated with the second lowest index/second position of the vector, and so forth. In some embodiments, metric prediction generation engine 310 is configured to store the combined, pool-level predicted metric data structure corresponding to each pool at predicted metric data structures storage 312.

VM selection engine 314 is configured to select sets of VMs to move from their source storage device(s) to destination storage device(s) within the same pool of storage devices. In various embodiments, VM selection engine 314 is configured to compare each combined predicted metric of a combined predicted metric data structure associated with a pool to a predetermined threshold value associated with the corresponding metric type. In the event that the combined predicted metric exceeds the predetermined threshold value, then the combined predicted metric (and its associated metric type) is identified as one that is to be improved. For example, each predetermined threshold value comprises a high probability of the occurrence of the metric type (e.g., an undesirable scenario or event). In some embodiments, VM selection engine 314 is configured to determine candidate sets of VMs to move off their current source storage device(s) such that by doing so, the updated combined predicted metric of one or more metric types associated with combined predicted metrics may be improved (e.g., their probabilities may be lowered below the predetermined threshold values). In some embodiments, VM selection engine 314 is configured to determine which destination storage device to move a candidate set of VMs such that by doing so, the updated combined predicted metrics improve over their current values, with preference given to improving those combined predicted metrics associated with metric types associated with higher priorities. In some embodiments, VM selection engine 314 is configured to use user configured rules and/or other rules in VM restriction rules storage 320 (e.g., rules that determine which VMs can or cannot be moved to and from) to constrain the search for which sets of VMs to move and how. In some embodiments, VM selection engine 314 is configured to use storage device attributes (e.g., maximum capacity, flash capacity, compression/dedupe capabilities, and maximum normalized IOPS) stored at storage device attributes storage 324 to constrain the search for which sets of VMs to move and how. In some embodiments, VM selection engine 314 is further configured to use the relative performance of each storage device to other storage devices within the same pool to constrain the search for which sets of VMs to move and how. In some embodiments, a metric of "performance reserves" is computed by each storage device as a measure of its available performance capacity. In some embodiments, the performance reserves of a storage device are shown on a scale of 0 to 100%. Some storage devices have greater performance, so when moving a VM, the performance reserves need to be re-evaluated in terms of their impact on the new storage device. Re-evaluating performance reserves is performed by constructing the effective data from the source of the performance reserves computation (e.g., IOPS and throughput measurements) rather than previously determined performance reserves themselves. In another example, the performance reserves may also be scaled up and down based on the relative capacities of the storage device models. This is just a scaling factor associated with each model, and so would be similar to other storage device attributes like maximum capacity. In some embodiments, VM selection engine 314 is configured to cause space usage modeling engine 306 and access distribution modeling engine 308 to respectively generate updated storage device specific predicted metrics for different hypothetical/candidate migrations of sets of VMs between storage devices of the same pool. In some embodiments, VM selection engine 314 is configured to cause metric prediction generation engine 310 to generate updated combined predicted metrics for different hypothetical/candidate migrations of sets of VMs between storage devices of the same pool. In some embodiments, VM selection engine 314 is configured to send a selection of a set of VMs to move from their source storage device(s) to a destination storage device to recommendation engine 316.

Recommendation engine 316 is configured to generate a set of recommendations that includes selections of one or more sets of VMs to be moved from their current storage device(s) to respective new destination storage device(s) within the same pool. In some embodiments, each recommendation identifies the VMs to move, the source storage device(s) of the VMs, the destination storage device(s) of the VMs, and the expected benefit of the migration (e.g., the combined predicted metric of which metric type is predicted to be improved as a result of the migration). Recommendation engine 316 is configured to store the set of recommendations in recommendation history storage 318. In various embodiments, recommendation engine 316 is configured to cause a set of recommendations to be presented at user interface 322. A user may approve of one or more recommendations to be implemented via a selection at user interface 322. A user may also reject one or more recommendations to be implemented via a selection at user interface 322. Recommendation engine 316 is configured to initiate the implementation of the VM migration(s) associated with each of one or more user approved recommendations by, for example, sending data to a hypervisor associated with the VM(s) to migrate and/or a storage device from which the VM(s) are to be moved from/to.

Recommendation engine 316 is configured to periodically determine whether a recommendation that is presented at user interface 322 is still valid. In some embodiments, recommendation engine 316 may determine whether any circumstances changed since a recommendation was generated such that it would no longer be available to be implemented. For example, a deletion of a VM that is included in a recommendation may cause that recommendation to become invalidated. Invalidated recommendations may be removed from being presented at user interface 322 and in some embodiments, the invalidation of a recommendation may trigger the presentation of a previously generated but not presented recommendation and/or the presentation of a new, alternative recommendation.

Recommendation history 318 is configured to store a history of previously generated recommendations. Recommendation history 318 may also store data indicating which historical recommendations were approved by a user to be implemented, which recommendations were not approved, and which recommendations were invalidated (and for which reason). In some embodiments, recommendation engine 316 is configured to periodically determine whether the combined predicted metrics associated with historical recommendations (whether they were approved to be implemented or not) matched the subsequent actual combined metrics of each pool of storage devices. The determined accuracy of the historical recommendations may be used to improve subsequent metric predictions.

Figure 4:
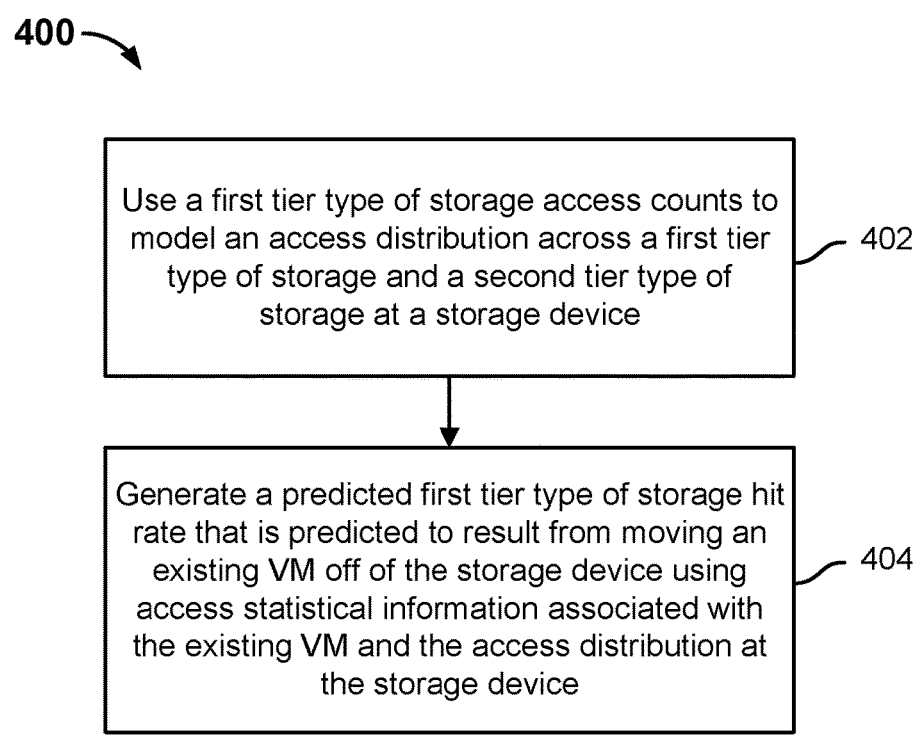
FIG. 4 is a flow diagram showing an embodiment of a process for predicting a hit rate associated with a given tier of storage at a storage device.

FIG. 4 is a flow diagram showing an embodiment of a process for predicting a hit rate associated with a given tier of storage at a storage device. In some embodiments, process 400 is implemented by VM load balancing server 112 of system 100 of FIG. 1.

At 402, a first tier type of storage access counts is used to model an access distribution across a first tier type of storage and a second tier type of storage at a storage device.

In various embodiments, the first tier type of storage comprises flash and the second tier type of storage comprises disk. Data of the VMs that reside at the storage device is stored across both flash and disk blocks. In various embodiments, every time a block in flash is read or written by the user, an access count associated with that logical block in flash is incremented. The measured (observed) access counts to each block in flash may be used to generate a flash histogram of how many flash blocks were accessed one time, two times, three times, and so forth. In some embodiments, every time that any block in disk is accessed to perform an operation (e.g., either a read or a write), the access count that is associated with disk is incremented. In some embodiments, an access to a block in disk is inferred any time a flash miss is observed. In various embodiments, the number of access counts to blocks in flash and to disk that have been collected for a predetermined period in the past (e.g., the past week) are used as training data to approximate an access distribution across the flash storage and disk storage at the storage device. As will be described in further examples below, the access distribution approximates the probability that different numbers of blocks in flash and disk were accessed (e.g., in the past week). The access distribution curve shows an inverse relationship between the number of blocks in either flash or disk and its corresponding probability of access.

In some embodiments, the area under the curve is 1. In some embodiments, the area under the left side of the curve associated with the probabilities of access for blocks in flash represents the measured flash hit rate. In some embodiments, the area under the right side of the curve associated with the probabilities of access for blocks in disk represents the flash miss rate. As mentioned above, the sum of the flash hit rate and the flash miss rate is one.

At 404, a predicted first tier type of storage hit rate that is predicted to result from moving an existing VM off of the storage device is generated using statistical information associated with the existing VM and the access distribution at the storage device.

In various embodiments, a prediction parameter (which is sometimes referred to as the "d" parameter) is determined from the access distribution. In some embodiments, the prediction parameter (d) represents the highest probability of access for a block on disk. To predict the updated flash rate that could result from removing a VM that currently resides at the storage device from the storage device, in various embodiments, the accesses associated with that VM are removed from their respective locations of the access distribution curve, thereby changing the shape of the curve. The removal of the VM will likely free up space in flash and permit some data of the remaining VM(s) that was previously stored on disk to be promoted to flash. The addition of the new data in flash, the removal of data from disk, and the determined prediction parameter (d), among other known information, may be collectively used to determine the ratio between the area under the left side of the new curve over the entire area under the new curve, which is the predicted flash hit rate at the storage device.

Similarly, the flash hit rate at the storage device as a result of adding a new VM to the storage device may also be predicted using at least the addition of the new VM's data on flash, the addition of the new VM's data on disk, and the determined prediction parameter (d), as will be described in further detail below.

Figure 5:
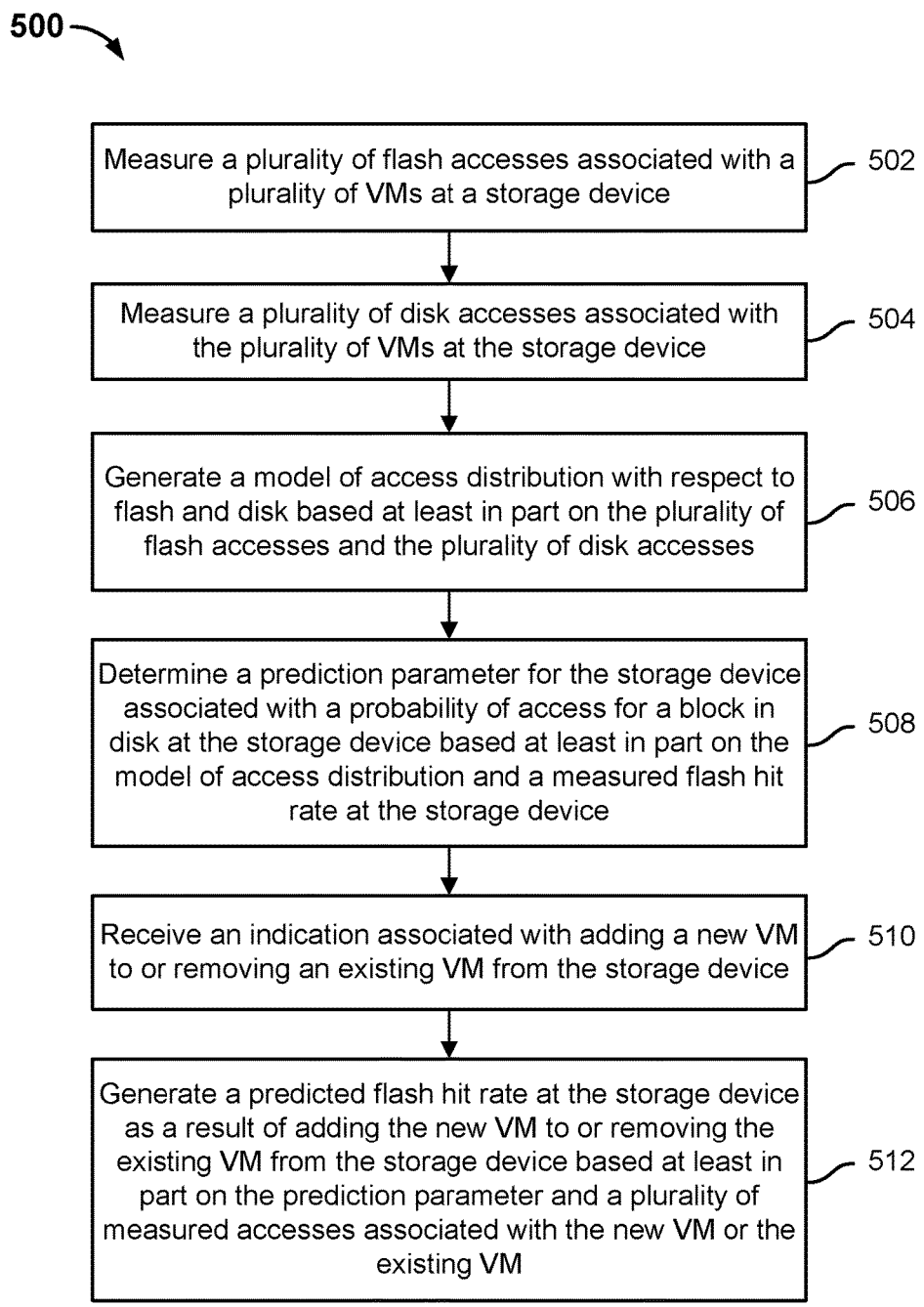
FIG. 5 is a flow diagram showing an example of a process for predicting a flash hit rate at a storage device.

FIG. 5 is a flow diagram showing an example of a process for predicting a flash hit rate at a storage device. In some embodiments, process 500 is implemented by VM load balancing server 112 of system 100 of FIG. 1. In some embodiments, process 400 of FIG. 4 may be implemented at least in part using process 500.

In the example of process 500, a storage device has flash as a higher tier of storage and disk as a lower tier of storage.

At 502, a plurality of flash accesses associated with a plurality of VMs at a storage device is measured.

In various embodiments, every time a block in flash is read or written by the user to any VM that resides at the storage device, an access count associated with that logical block in flash is incremented. In some embodiments, an access count lives in the tree pointing to the block, not the physical block metadata. Access counts are thus a property of (file, block) pairs, not just blocks. In order to keep the access counts from saturating, the access counts are aged out using a randomized "clock" algorithm. The clock decreases the access count on each block it visits by an amount proportional to its current access count. The clock continues until the average access count on all blocks within a single "eviction group" (a VM or vdisk) is below a threshold. For example, the threshold may be 32. The net effect is similar to picking a random access to "forget" for every new access that comes in.

A flash histogram may be generated based on the measured flash access counts. The flash histogram shows how many blocks in flash have a given access count. For example, the histogram buckets are linear (e.g., 0, 1, 2, 3, . . . ) up to 63, and exponential after that, mirroring how the bits in the access count field are used. In some embodiments, to get the most dynamic range out of a limited number of bits per block, e.g., 7, values 0-63 are configured to correspond directly to counts 0-63, but values 64-127 are configured to be assigned to an exponentially increasing number of counts. A randomized process is used to increment the count between values when the gap exceeds 1. Increments/decrements are probabilistic in the high buckets.

{"0": 30333511,
"1": 15526284,
"2":2948028,
"3": 947100,
"4": 368288,
. . . ,
"60": 6,
"61": 4,
"62": 3,
"63": 6,
"64": 10,
"65": 6,
"66": 9,
"67": 40,
"68": 37,
"70": 144,
"73": 299,
"76": 808,
"80": 1450,
"85": 1777,
"92": 1668,
. . . .
"7930": 0,
"9902": 1,
"12367": 0,
. . . .
"4078342": 0,
"5097920": 0}

The flash histogram may be viewed as a "map" of the frequency of access to the blocks in flash. The combination of read/write rate (in flash blocks), the number of logical blocks in flash, and the average access count indicate how long the "history" represented by the histogram is.

In some embodiments, the flash histogram is built based on the flash access counts obtained from the past week (or another configurable/predetermined historical period of time).

In some embodiments, an application programming interface (API) is configured per-VM and per-storage device. The storage device histogram is the sum of the VM histograms from the corresponding time period, plus the "default eviction group" histogram which contains all blocks not associated with a VM or vdisk.

In some embodiments, there may be some time skew since not all the flash histograms are collected immediately.

In some embodiments, the API includes a logicalBlocks counting the actual number of blocks in flash, which may differ from the sum of bucket counts, because updates to the bucket counts can be lost on failover. The flash histograms should be scaled so that the sum of buckets==logicalBlocks before use.

At 504, a plurality of disk accesses associated with the plurality of VMs at a storage device is measured.

In some embodiments, every time a block in disk is read or written by the user to any VM that resides at the storage device, an access count disk is incremented. In some embodiments, an access count is maintained for each block in disk. In some embodiments, an access count is maintained across all blocks in disk.

In some embodiments, the measured number of flash misses is inferred as the access count to disk.

In various embodiments, the total number of accesses (e.g., including both reads and writes) across flash and disk (e.g., over the past week) is measured and sometimes referred to as "N." In various embodiments, the flash hit rate and flash miss rate at the storage device (e.g., over the past week or some other configurable training period) are also measured. The number of flash misses may be determined as the product of the measured flash miss rate and the total number of accesses across flash and disk, N.

At 506, a model of access distribution with respect to flash and disk is generated based at least in part on the plurality of flash accesses and the plurality of disk accesses.

If a "true" frequency of access were known, then the flash and disk blocks could be sorted from the most-frequently accessed to the least-frequently accessed to determine a true distribution of accesses. While the true distribution of accesses is a discrete probability distribution (since there are a finite number of blocks in flash and disk), the number of blocks across flash and disk is large so the true distribution of accesses can be assumed to be a continuous distribution. As such, the integral of the probability distribution from 0 to block Y provides what percentage of block accesses (block-sized reads and writes) are to blocks in that range.

Figure 6:
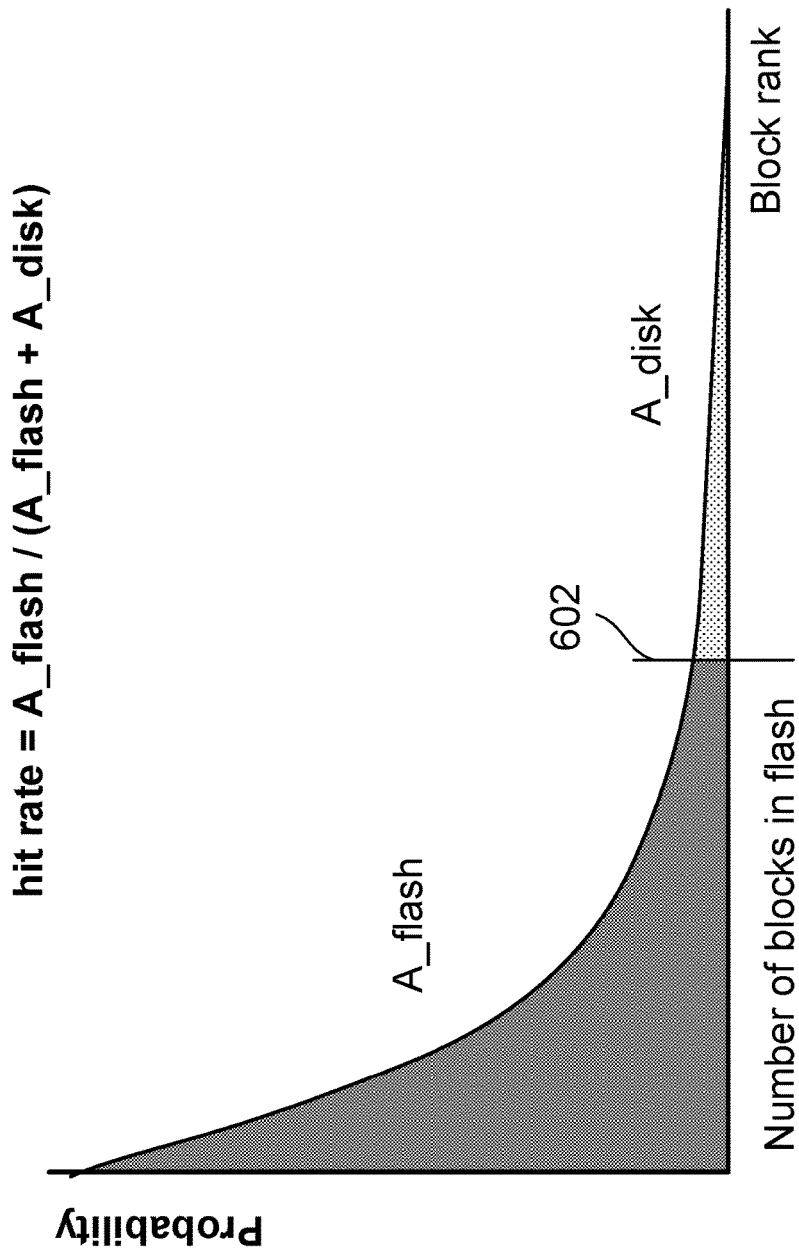
FIG. 6 shows a graph of a true distribution of access.

In particular, if the number of blocks that fit in flash is known, then the flash hit rate can be predicted. FIG. 6 shows a graph of a true distribution of access. In the curve of FIG. 6, the blocks are ranked from left-to-right, from the most-frequently accessed to the least—frequently accessed, along the block rank x-axis of the graph. Because blocks that are more frequently accessed (and are therefore "hotter") are stored in flash, flash blocks appear on the left side of the block rank x-axis and disk blocks therefore appear on the right side of the block rank x-axis. Line 602 identifies a selected block in disk and will be associated with the prediction parameter d, as will be described in further detail below. In various embodiments, the selected block in disk is the most-frequently accessed (the "hottest") block in disk. As shown in FIG. 6, the flash hit rate at the storage device is represented by the area under the curve across the blocks in flash (over the entire area under the curve, which is 1) and the flash miss rate at the storage device is represented by the area in the tail of the curve across the blocks in disk (over the entire area under the curve, which is 1).

However, since the true frequency of accesses is not known and only the derived flash histogram is known based on the measured sample of flash and block accesses from the past week, the model of access distribution is to be approximated. In some embodiments, the approximated model of access distribution is generated by first quantizing the flash block histogram into integer multiples. Flash blocks in bucket 0 do not have 0% probability of being accessed, it is just less than 1/N, where N is the total number of accesses represented. Linear interpolation is then used between the buckets to approximate a smooth curve over the area of the access distribution associated with flash blocks and the measured number of flash misses is used to approximate the number of disk accesses in the tail of the curve. Further examples of approximating the model of access distribution using the generated flash histogram and measured flash misses will be described in FIGS. 7-9, below.

Returning to FIG. 5, at 508, a prediction parameter associated with a probability of access for a block in disk is determined for the storage device based at least in part on the model of access distribution and a measured flash hit rate at the storage device.

In various embodiments, a prediction parameter (d) is determined as the probability of access of the most-frequently accessed (the "hottest") block on disk. As will be described in further examples below, prediction parameter d may be determined using known values associated with measured flash accesses and the properties of the access distribution curve. Referring to the graph of FIG. 6, prediction parameter d is the probability of access for the block on disk that is identified by line 602.

Returning to FIG. 5, at 510, an indication associated with adding a new VM to or removing an existing VM from the storage device is received.

The generated model of access distribution and prediction parameter d may be used to generate a predicted flash hit rate at the storage device should an existing VM at the storage device be removed from the storage device (e.g., for a load balancing technique). The generated model of access distribution and prediction parameter d may be used to generate a predicted flash hit rate at the storage device should a new VM be added to the storage device (e.g., for a load balancing technique). Put another way, the generated model of access distribution and prediction parameter d that have been generated for a storage device may be used to provide a predicted flash hit rate (and a predicted flash miss rate) for hypothetical scenarios in which a VM is either removed from or added to the storage device, prior to executing actual VM migrations. Therefore, in some embodiments, the generated model of access distribution and prediction parameter d that are generated for each storage device may be used to evaluate whether migrating a VM to or from a storage device (e.g., for a load balancing technique) is a desirable option with respect to the predicted impact on flash hit rates that would result from such migrations.

At 512, a predicted flash hit rate at the storage device as a result of adding the new VM to the storage device or removing the existing VM from the storage device is generated based at least in part on the prediction parameter and a plurality of measured accesses associated with the new VM or the existing VM.

How big does a change in flash hit/miss rate need to be to be significant? The simplest approach is simply to round off the predicted hit/miss rate to the nearest 0.1%. This will indicate the difference between a flash hit rate of 100% and 99.9%, but treat 99.85% and 99.90% as the same result. If clustering units of 0.1% are used, then it will take no more than 20 clusters to get from, say, 95% to 97%.

For example, in response to an indication of removing an existing VM from the storage device, measured accesses for the VM on flash and disk are first removed from the model access of distribution associated with the storage device. Removing accesses from the model access of distribution associated with the storage device would change the curve (by shrinking the area under the curve). Prediction parameter d that was previously determined for the storage device and the updated curve of the access distribution may then be used to determine the predicted flash hit rate at the storage device for this VM removal scenario. Examples of removing a VM and determining the predicted, resultant flash hit rate at a storage device are described with FIGS. 10-11B, below.

For example, in response to an indication to add a new VM (that previously resided at a different storage device) to the storage device, accesses for the VM on flash and disk that were measured at its source storage device are scaled and/or otherwise augmented to match the properties of the destination storage device and then added to the model of access distribution at the destination storage device. Adding accesses to the model access of distribution associated with the storage device would change the curve (by increasing the area under the curve). Prediction parameter d that was previously determined for the storage device and the updated curve of the access distribution may then be used to determine the predicted flash hit rate at the storage device for this VM addition scenario. Examples of adding a VM and determining the predicted, resultant flash hit rate at a storage device are described with FIGS. 12-15B, below.

While the model of access distributions is generated on a block-basis, in some embodiments, the measured and/or predicted flash hit rate is to be reported to a user on a byte-basis. The following is an example technique by which to convert a measured or predicted flash hit rate from being on a block-basis to being on a byte-basis. As mentioned above, in various embodiments, an assumption is made that the probability distribution in the flash histogram and therefore, model of access distribution, is the same for reads and writes. Because the flash hit rate is measured on reads only (writes always go to flash, in some embodiments) it makes sense to make the simplifying assumption that the distribution of reads and the distribution of writes are similar. So flash writes do not need to be explicitly included into the calculation of prediction parameter d.

However, the histogram is one of blocks rather than bytes, so it makes sense to calculate the hit rate of block accesses rather than the hit rate on bytes. Suppose that most misses are to small reads, while hits are to large reads:

10000 flash reads of 32 KB (4 blocks)
500 reads of 2 KB (1 block)

block miss rate=500*1/(500*1+10000*4)=1.2% byte miss rate=500*2/(500*2+10000*32)=0.3%

For each time period, calculate the average read size (throughputReadMBps*106/operationsReadIops). Round up to the nearest 8 KB boundary to get "blocksPerRead."

Then throughputReadMBps*flashHitPercent/(average read size)*blocksPerRead is an estimate of number of blocks read from flash. throughputReadMBps*(1.0−flashHitPercent)/(average read size)*blocksPerRead estimates the number of blocks read from disk.

When describing the measured or predicted flash hit rate to the user (and comparing to thresholds, for example), in some embodiments, one way to do so is to remember the ratio between the two calculations of block miss rate and byte miss rate. In the example above, the block miss rate is 4× higher than the byte miss rate. When a new block miss rate is computed, which is 1.0%, for example, this new block miss rate is divided by 4× ratio to get a byte miss rate of 0.25%.

The default option is to remember the byte-rate to block-rate factor X and multiply the prediction by 1/X to convert back to byte-rate.

Block eviction on a storage device tries to keep flash somewhat less than entirely full. The target value is a fraction of the "allowed bytes" assigned to the eviction pool, called "desired bytes." "Allowed bytes" refers to the size of the flash drive, minus any reserve kept unused by the file system. "Desired bytes" refer to a maintained target seize to allow a buffer for incoming writes to be handled. The system works to bring flash usage down to "desired bytes" which is less than the maximum, but the system is engineered on the assumption that this is how much flash is available to serve user reads.

Because the maximum is in a number of bytes, it is needed to convert blocks to bytes to find the correct endpoint of the integral. The histogram API has a bytesPerBlockEstimate which should be used, from the whole-storage device histogram. The destination bytesPerBlockEstimate should be used to calculate the destination integral, and vice versa.

Figure 7:
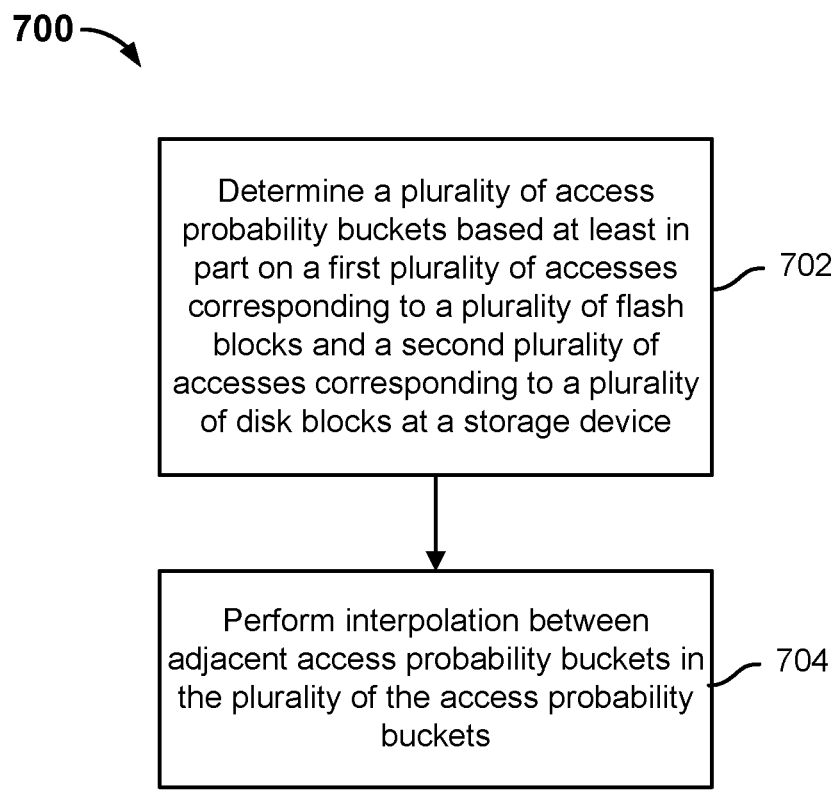
FIG. 7 is a flow diagram showing an example of a process for generating a model of access distribution.

Expected hit rate=(integral from 0 to (desired bytes/bytesPerBlockEstimate) of estimated frequency curve)/total area under estimated frequency curve FIG. 7 is a flow diagram showing an example of a process for generating a model of access distribution. In some embodiments, process 700 is implemented by VM load balancing server 112 of system 100 of FIG. 1. In some embodiments, step 506 of process 500 of FIG. 5 may be implemented using process 700.

At 702, a plurality of access probability buckets is determined based at least in part on a first plurality of accesses corresponding to a plurality of flash blocks and a second plurality of accesses corresponding to a plurality of disk blocks at a storage device.

The flash histogram that may be derived from raw data (measured accesses to flash blocks) can be quantized into integer multiples. Each bucket may be labeled as Bucket B=0, 1, 2, . . . , etc. Every block in Bucket B is assumed to have the same probability B/N of access (where N is the total number of accesses—so that the probability distribution sums to 1). Blocks in Bucket 0 are assumed to have no accesses. Every block on disk can be assumed to have some small constant probability. This probability can be estimated using the measured flash hit rate (e.g., from the past week). If X percent of all measured accesses go to disk, then X percent of the probability distribution must be in the blocks on disk. The integration here is simple summation of (number of blocks in bucket)*(label of bucket).

In some embodiments, the following assumptions are used in creating a model of access distribution:
The eviction algorithm is successful at keeping high-frequency blocks in flash rather than on disk.

The distribution of accesses does not significantly differ between reads and writes.

Writes always go to flash and are included in the histogram, but writing data from flash back to disk does not need to be accounted for.

The presence of blocks in Bucket 0 is ignored. They are almost certainly absorbing some reads but this is entirely discounted.

In this approximate model, blocks in bucket zero are assumed to be the same average hotness as blocks in disk, i.e., close to zero. A constant probability within Bucket 0+disk blocks appears to strongly overweight accesses within the tail, leading to very large working set estimates. In order to capture significantly more of the accesses, many more blocks need to be moved into flash.

Figure 8:
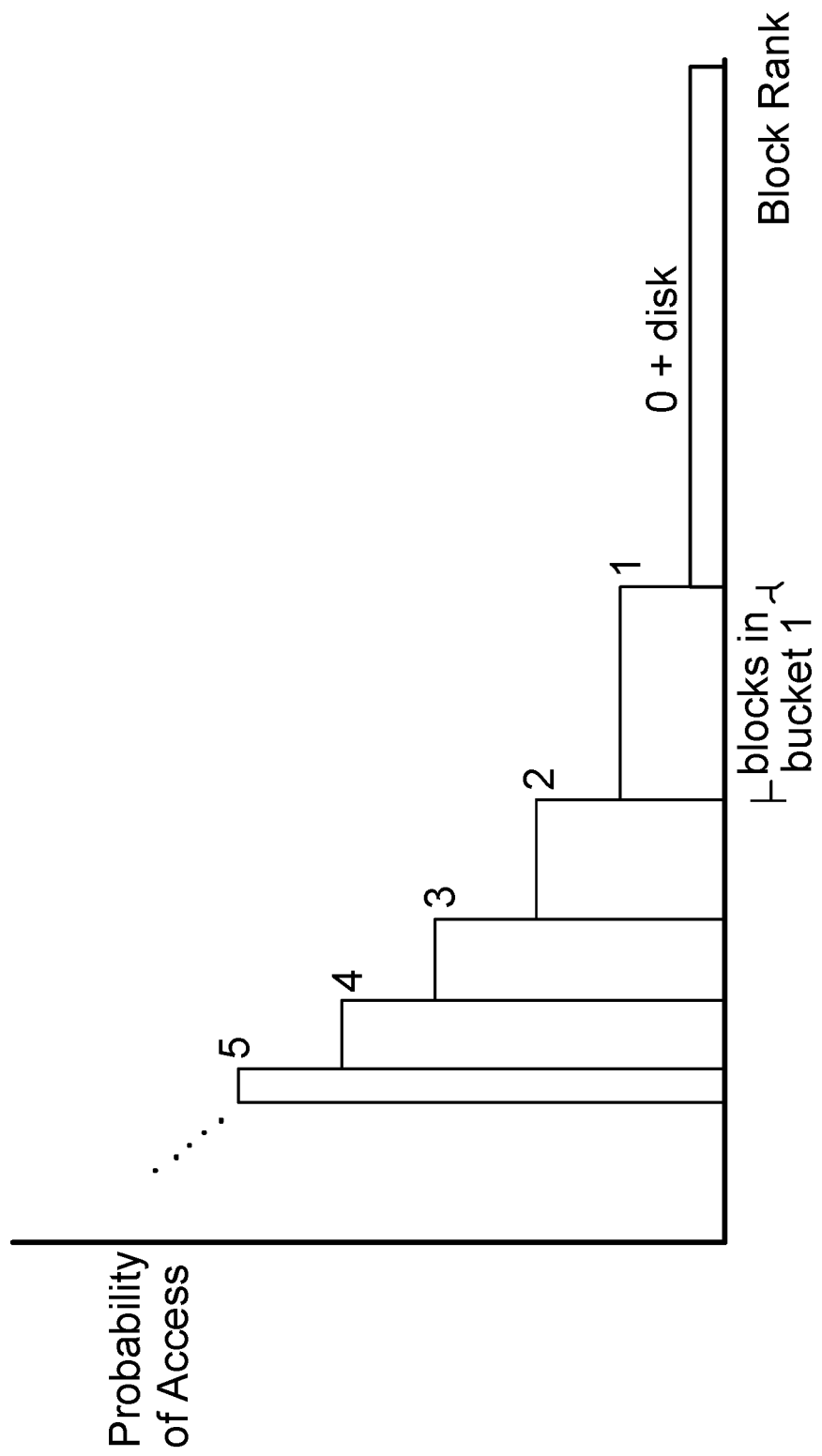
FIG. 8 is an example depiction of a series of buckets that have been quantized from raw data included in a flash histogram and/or a measured flash hit rate.

FIG. 8 is an example depiction of a series of buckets that have been quantized from raw data included in a flash histogram and/or a measured flash hit rate. The series of buckets form an intermediate basis for ultimately creating a smoothed model of access distribution at the storage device, as will be described below.

Returning to FIG. 7, at 704, interpolation is performed between adjacent access probability buckets in the plurality of access probability buckets. Interpolation is performed between the adjacent access probability buckets in order to transform the intermediate model into the smoothed model of access distribution at the storage device.

Figure 9:
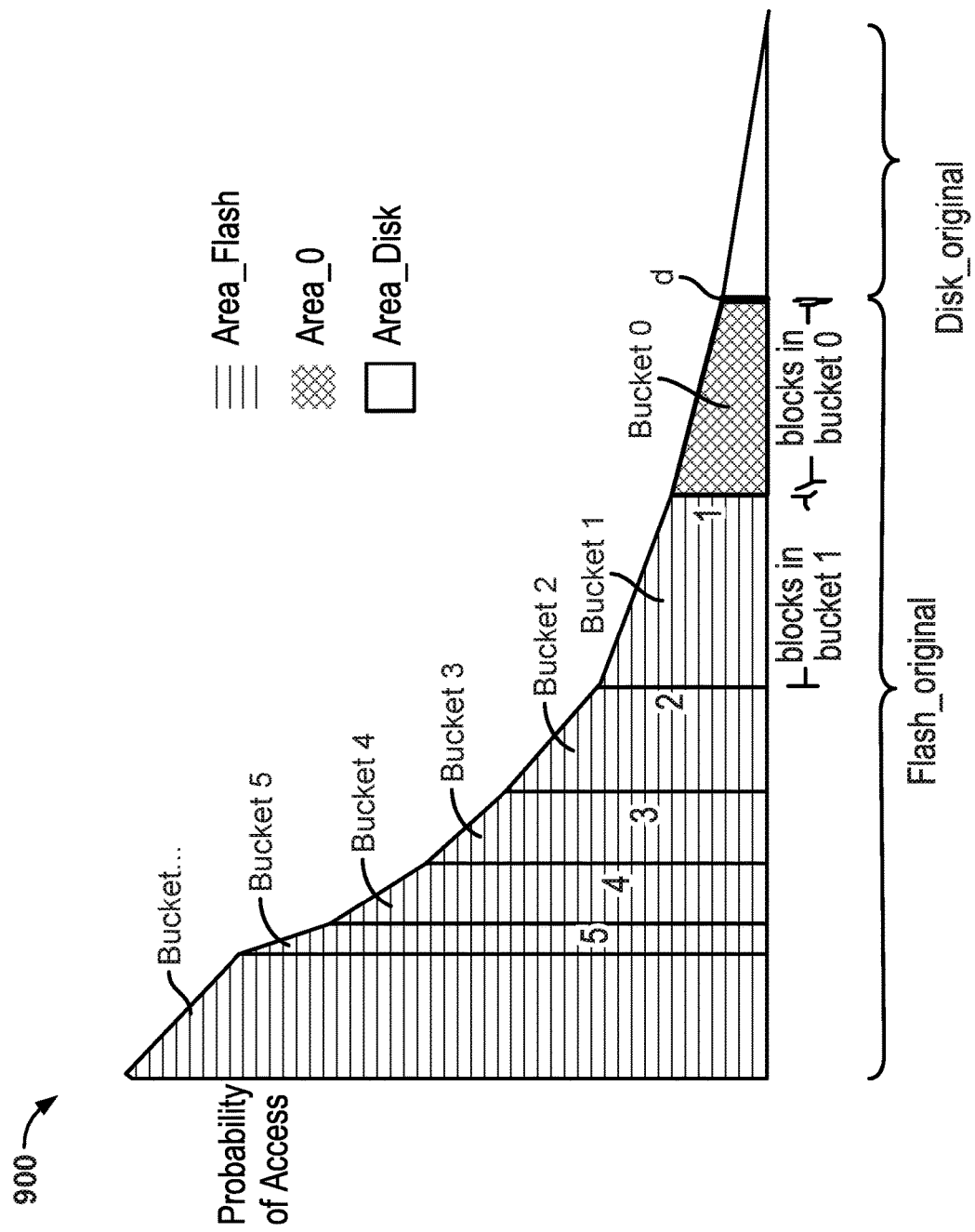
FIG. 9 shows a smoothed model of access distribution.

FIG. 9 shows a smoothed model of access distribution. Model of access distribution 900 comprising buckets of blocks, such as shown in FIG. 8, is then smoothed by performing linear interpolation in between the heights of adjacent buckets to obtain a piecewise-linear model of access distribution. This means that the blocks in Bucket 1, instead of all having probability 1/N, now are in the range [1/N', 2/N'). Note that this increases the number of "accesses" represented in the histogram, so the sum of (blocks_i)*(buckets_i) is no longer the area under the curve. Furthermore, data from the flash histogram (which does count blocks in bucket zero) is used to separate the bucket-zero and disk blocks into their own portion of the curve.

All the trapezoids in the curve span the number of blocks in flash (which is referred to as "flash_original") and the remaining tail of the curve, which forms a triangle, spans the blocks in disk (which is referred to as "disk_original"). The area under the curve across all the trapezoids other than the trapezoid associated with bucket 0 may be referred to as "A_flash." The area of the trapezoid associated with bucket 0 may be referred to as "A_0." The area of the triangle in the tail of the curve that spans the number of disk blocks that have been accessed is referred to as "A_disk." The shared left side of the triangle ("A_disk") and the right side of the trapezoid that was created based on bucket 0 ("A_0") is denoted as d, the prediction parameter. The relationship among A_flash, A_0, and A_disk is such that A_flash+A_0+A_disk=1. The relationship among A_flash, A_0, and A_disk, along with the measured flash hit rate at the storage device, may be used to solve for prediction parameter d, as will be shown below:

The formula for the area of a trapezoid is A=(a+b)h/2, where a and b are the lengths of the parallel sides. So for this piecewise function, the area of a trapezoid that is determined from Bucket B=(½)*[Bucket B+(Bucket B+1)]*(number of blocks in Bucket B).

$$A\_disk = (0 + d) * \frac{\text{number of blocks on disk}}{2} \quad (1)$$

$$A\_0 = (d + 1) * \frac{\text{number of blocks in bucket 0}}{2} \quad (2)$$

$A_{\text{flash}}$=the sum of trapezoidal areas corresponding to buckets 1, 2, 3, . . . . (3)

It is desired to set the measured flash miss rate to equal the proportion of the area represented by A_disk.

$$A\_disk=(\text{measured flash miss rate})*(A\_disk+A\_0+A\_flash) \quad (4)$$

Substituting formula (1) for A_disk in formula (4), the following is obtained.

$$d * \frac{\text{number of blocks on disk}}{2} = \quad (5)$$
$$(\text{measured flash miss rate}) * (A\_disk + A\_0 + A\_flash)$$

Solving for prediction parameter d gives:

$$d = -\frac{M(2*A + B0)}{(\text{Disk\_original}*(M - 1) + B0 * M)} \quad (6)$$

Where M=measured flash miss rate, A=A_flash, B0=the number of blocks in bucket 0, and Disk_original=the number of blocks on disk.

After prediction parameter d is obtained for a storage device using the model of access distribution that has been generated for that storage device using the measured accesses to flash and disk, d may be stored and later used to determine the predicted flash hit/miss rate associated with either adding a new VM to the storage device and/or removing an existing VM from the storage device.

Figure 10:
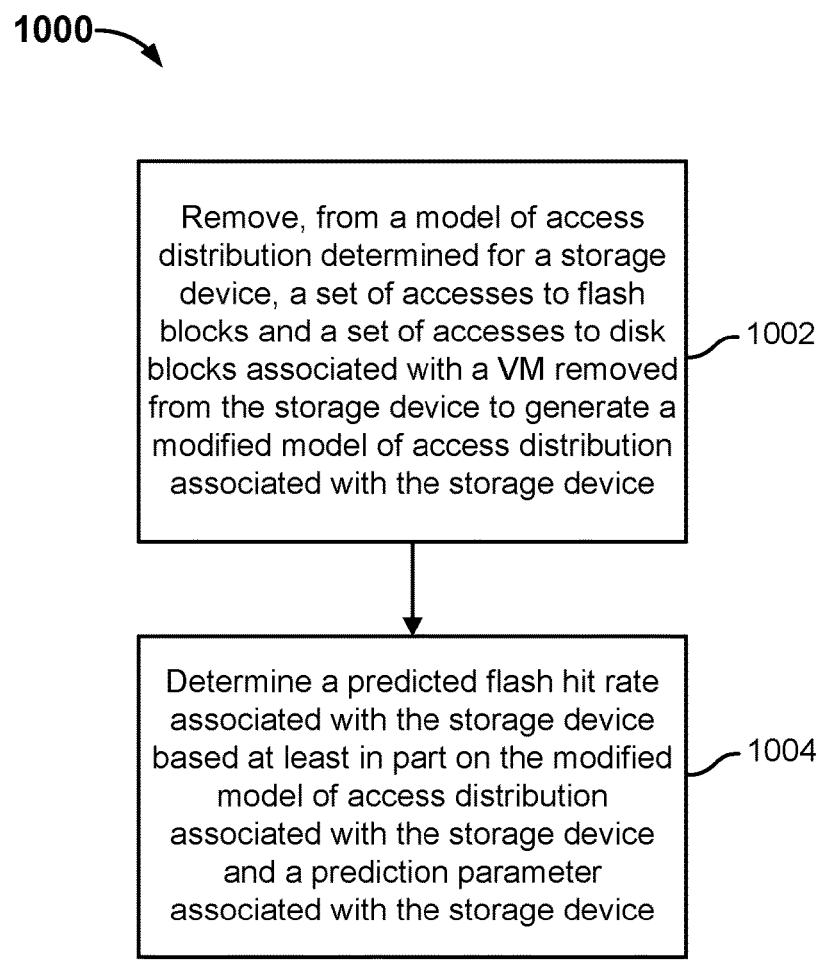
FIG. 10 is a flow diagram showing an example of a process for predicting a flash hit rate at a storage device in response to a removal of a VM from the storage device.

FIG. 10 is a flow diagram showing an example of a process for predicting a flash hit rate at a storage device in response to a removal of a VM from the storage device. In some embodiments, process 1000 is implemented by VM load balancing server 112 of system 100 of FIG. 1. In some embodiments, step 512 of FIG. 5 may be implemented at least in part using process 1000.

At 1002, from a model of access distribution determined for a storage device, a set of accesses to flash blocks and a set of accesses to disk blocks associated with a VM removed from the storage device is removed to generate a modified model of access distribution associated with the storage device.

A model of access distribution and a prediction parameter, d, have already been generated for a storage device using a process such as process 500 of FIG. 5. In response to an indication to predict the flash hit rate at the storage device subsequent to the actual or hypothetical removal (e.g., to be used in performing load balancing of VMs among storage devices) of a VM from its source storage device, the historical accesses to flash and disk that have been attributed to that VM during the historical period (e.g., past week) from which access data was used to generate the model of access distribution are removed from the model of access distribution. As mentioned before, in some embodiments, a flash histogram is maintained on a per-VM basis and the model of access distribution at a storage device is determined based on the combination of flash histograms corresponding to all VMs that reside at the storage device. Removing one of a VM's block in flash involves shrinking the width of the corresponding bucket/trapezoid to which the block belonged by one block and also shrinking the height in the curve by the number of accesses that were associated with the removed block in flash. Similarly, removing one block of the VM in disk involves shrinking the width of the triangle in the tail of the access distribution curve by one block and also shrinking the height in the curve by the number of accesses that were associated with the removed block in disk.

At 1004, a predicted flash hit rate associated with the storage device is determined based at least in part on the modified model of access distribution associated with the storage device and a prediction parameter associated with the storage device.

As a result of removing the accesses in flash and disk that correspond to the VM to be or has already been removed, some blocks of data that were previously stored in disk will be promoted/shifted into one or more flash trapezoids, thereby reducing the width of the triangular tail under the curve associated with the model of access distribution (i.e., the number of blocks in disk). Due to the fewer number of blocks of data that are stored on disk at the storage device, the flash hit rate at the storage device after an existing VM is removed from the storage device is expected to improve (e.g., increase closer to 1). The specific flash hit rate at the storage device after an existing VM is removed from the storage device is predicted using the previously determined prediction parameter d for the storage device, as will be described with the examples of FIGS. 11A and 11B.

Figure 11A:
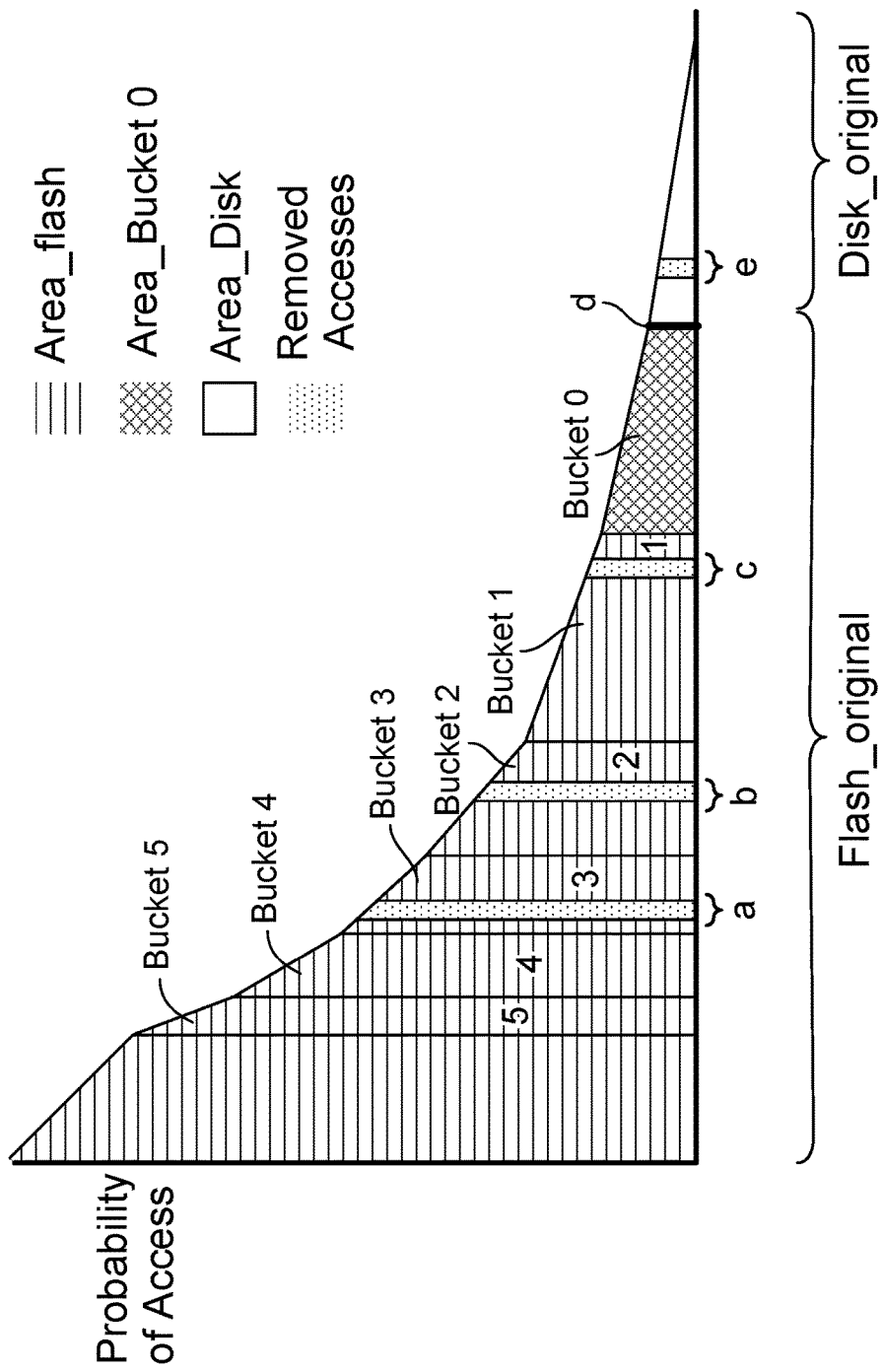
FIG. 11A is a diagram showing an example of modifying a model of access distribution associated with a storage device by removing accesses associated with a removed VM.

FIG. 11A is a diagram showing an example of modifying a model of access distribution associated with a storage device by removing accesses associated with a removed VM. The width of each black band within the trapezoids corresponding to a respective bucket represents the number of flash blocks within that trapezoid that are associated with the removed VM and that therefore are to be removed from those respective trapezoids. As such, "a" blocks are removed from the trapezoid corresponding to Bucket 3, "b" blocks are removed from the trapezoid corresponding to Bucket 2, and "c" blocks are removed from the trapezoid corresponding to Bucket 1. Similarly, the width of the black band within the triangular area in the curve of the model of access distribution represents the number of accesses to disk blocks that are associated with the removed VM and that therefore are to be removed from the triangular area. As such, "e" blocks are removed from the triangular area of the model of access distribution. Furthermore, the area of each black band in the diagram represents the number of accesses associated with each of "a," "b," "c," and "e" blocks that are being removed.

Figure 11B:
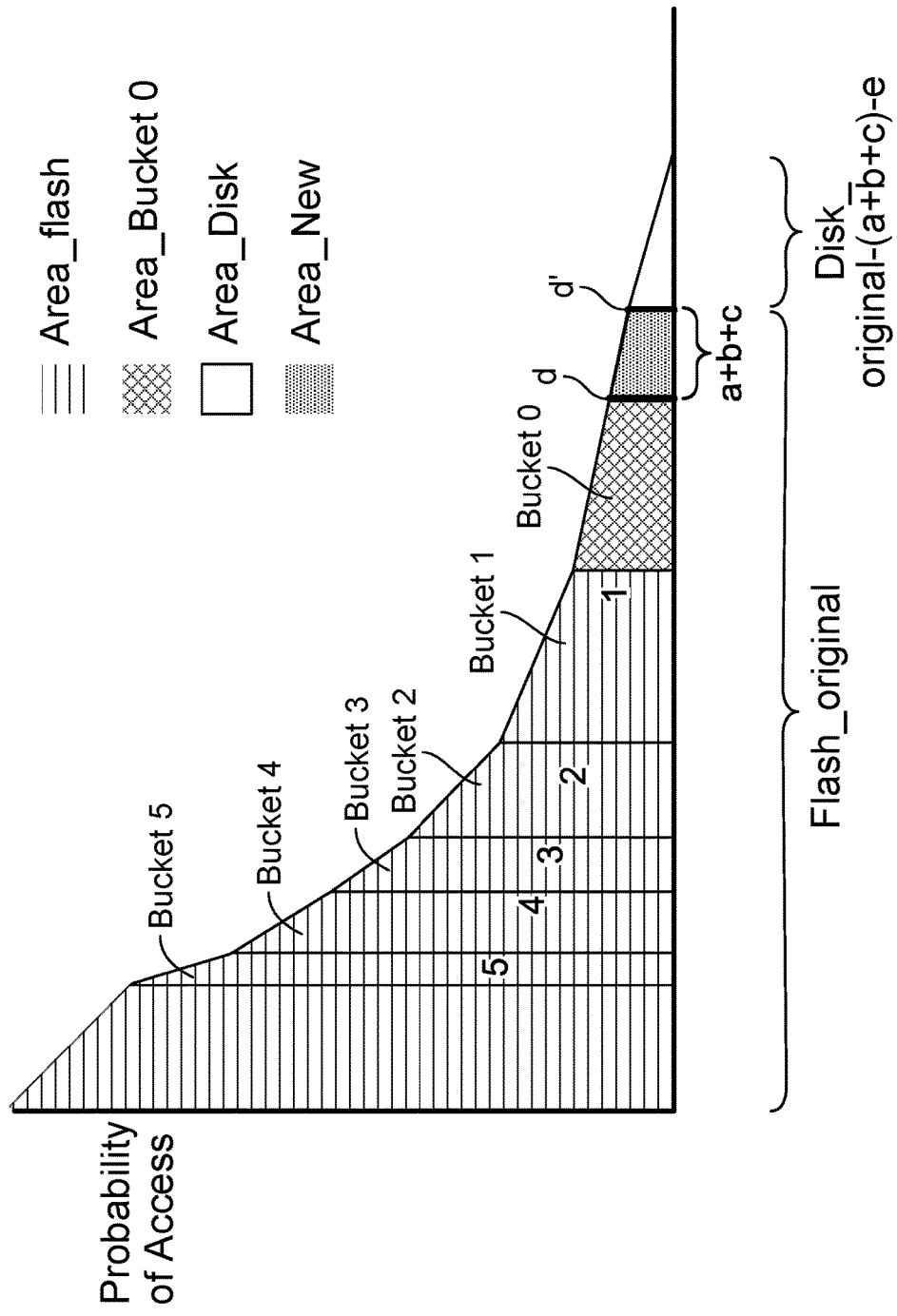
FIG. 11B is a diagram showing an example of a modified model of access distribution associated with a storage device after accesses associated with a removed VM have been removed.

FIG. 11B is a diagram showing an example of a modified model of access distribution associated with a storage device after accesses associated with a removed VM have been removed. Continuing the example of FIG. 11A, due to the removal of "a+b+c" blocks from flash, the width of each bucket (Buckets 3, 2, and 1) from which accesses to blocks were removed is reduced. Furthermore, due to the newly created absence of "a+b+c" blocks from flash as a result of the removed VM, as many as "a+b+c" blocks may be promoted into flash from disk. As a result of promoting "a+b+c" blocks from disk into flash and additionally removing "e" blocks from disk, the width of the triangular area under the curve of the model of access distribution is "a+b+c+e" blocks less than the number of blocks of data that were originally stored on disk (Disk_original).

The predicted flash hit rate at the storage device after the actual or hypothetical removal of the VM may be determined as the area under the curve of the model of access distribution across all the flash blocks over the sum of the area under the curve of the model of access distribution across all the flash blocks and the new triangular area under the curve of the model of access distribution across all the disk blocks. The area under the curve of the model of access distribution across all the flash blocks may be determined as the sum of all the trapezoidal areas (Area_flash+Area_Bucket 0+Area_New). Put another way, the predicted flash hit rate at the storage device may be determined as:

$$\text{Predicted flash hit rate} = \frac{\text{sum of all trapezoidal areas}}{\text{sum of all trapezoidal areas} + \text{new triangular area}} = \frac{\text{Area\_flash} + \text{Area\_Bucket 0} + \text{Area\_New}}{(\text{Area\_flash} + \text{Area\_Bucket 0} + \text{Area\_New}) + (\text{Area\_Disk})} \quad (7)$$

As mentioned above, the area of a trapezoid corresponding to a bucket is Bucket B=(½)*[Bucket B+(Bucket B+1)]*(number of blocks in Bucket B). Due to the removal of accesses to blocks from Buckets 3, 2, and 1 (as described with FIG. 11A, above), each of the areas of Buckets 3, 2, and 1 are shrunken accordingly. The areas in the remaining buckets have not changed. The new trapezoid to the right of the trapezoid corresponding to Bucket 0 is formed as a result of the removal of accesses from Buckets 3, 2, and 1. The area of the new trapezoid (Area_New) can be determined as =(½)*[d+d']*(number of blocks in new trapezoid). The number of blocks in the new trapezoid is "a+b+c," which is the number of blocks that were promoted from disk into flash, d (the left side of the new trapezoid) is the prediction parameter that was previously determined for the storage device, and d' (the right side of the new trapezoid) is to be computed. The new triangular area (Area_Disk) can be computed as the area of a right angled triangle, which would be (½)=d'*(Disk_original—(a+b+c)–e), so d' is also required to be solved to compute Area_Disk.

If the hypotenuse of the new triangular area associated with disk accesses of the modified model of access distribution is assumed to be linear and the new triangular area is assumed to form a right angled triangle, the value of d' can be computed by assuming the constant ratio of the two legs of the right angled triangle. Therefore, the following equation is therefore assumed to be true:

$$\frac{d'}{d} = \frac{\text{Disk\_original} - (a+b+c) - e}{\text{Disk\_original}} \quad (8)$$

Formula (8) may be rewritten to isolate d' as follows:

$$d' = d\left(\frac{\text{Disk\_original} - (a+b+c) - e}{\text{Disk\_original}}\right) \quad (9)$$

Once the value of d' is determined, the area of the new trapezoid (Area_New) can be determined and the new triangular area (Area_Disk) can both be computed to determine predicted flash hit rate using formula (7).

Figure 12:
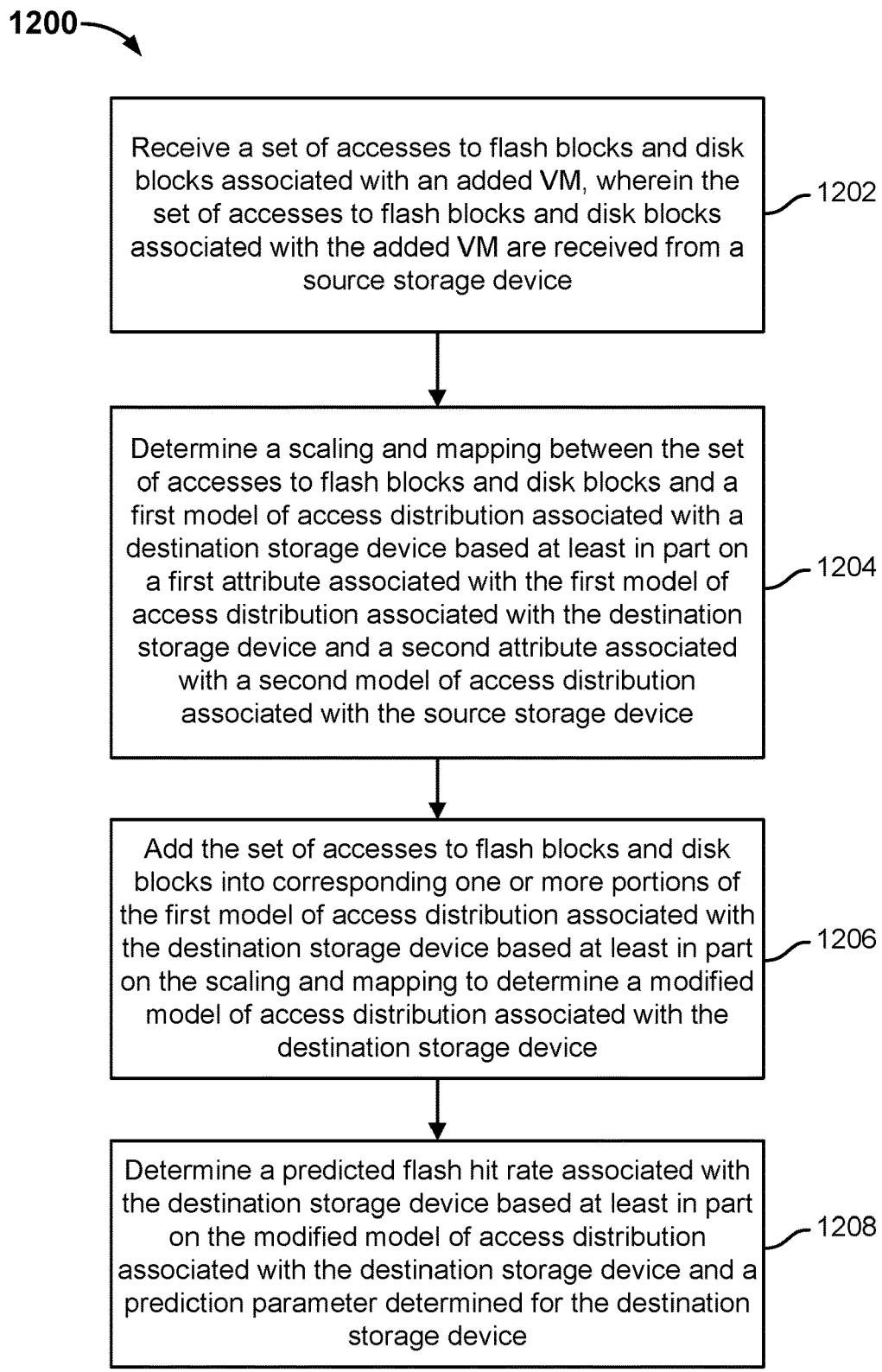
FIG. 12 is a flow diagram showing an example of a process for predicting a flash hit rate at a storage device in response to an addition of a VM.

FIG. 12 is a flow diagram showing an example of a process for predicting a flash hit rate at a storage device in response to an addition of a VM. In some embodiments, process 1200 is implemented by VM load balancing server 112 of system 100 of FIG. 1. In some embodiments, step 512 of FIG. 5 may be implemented at least in part using process 1000.

Process 1200 is an example process that describes modifying a model of access distribution of a destination storage device in response to the addition of a VM that is moved over from a source storage device. Unlike the removal of a VM from a storage device, such as described with the example of process 1000, the historical accesses to flash and disk associated with an added VM (that were recorded at the VM's source storage device) are first converted to match the time scale with which the model of access distribution was generated for the destination storage device is associated before being added to the model of access distribution that was generated for the destination storage device, as will be described above.

At 1202, a set of accesses to flash blocks and disk blocks associated with an added VM is received, wherein the set of accesses to flash blocks and disk blocks associated with the added VM is received from a source storage device.

A model of access distribution and a prediction parameter, d, have already been generated for a destination storage device using a process such as process 500 of FIG. 5. In response to an indication to predict the flash hit rate at the storage device subsequent to the actual or hypothetical addition (e.g., to be used in performing load balancing of VMs among storage devices) of a VM from its source storage device, the historical accesses to flash and disk that have been attributed to that VM during the historical period (e.g., past week) from which access data was used to generate the model of access distribution are first obtained from the VM's source storage device.

At 1204, a scaling and mapping between the set of accesses to flash blocks and disk blocks and a first model of access distribution associated with the destination storage device is determined based at least in part on a first attribute associated with the first model of access distribution associated with the destination storage device and a second attribute associated with the second model of access distribution associated with the source storage device.

In some embodiments, models of access distribution that are generated for different storage devices are generated based on historical accesses to flash and disk blocks that were measured over different periods of times. While in the examples above, it is described that a past week's measured accesses to flash and disk blocks at a storage device is used to generate its flash histogram and therefore, model of access distribution, in some instances, a past month or some other historical period's measured accesses to flash and disk blocks at a storage device is used as the training period to generate the storage device's flash histogram/model of access distribution. A block with 1/Nth probability of being accessed per month is obviously not the same as a block with 1/Nth probability of accessed per week, or per day. Thus, the intensity of I/O needs to be taken into account rather than directly adding the flash and disk block accesses of the added VM obtained from the VM's source storage device's flash histogram/model of access distribution into the model of access distribution that has been determined for the destination storage device. In various embodiments, the attribute of the corresponding time period over which flash/disk accesses were used to generate a source storage device's model of access distribution and the attribute of the corresponding time period over which flash/disk accesses were used to generate a destination storage device's model of access distribution are compared to determine the scaling/mapping of the added VM's historical accesses relative to the model of access distribution that has been determined for the destination storage device.

As such, the historical accesses to flash and disk blocks associated with the added VM that are obtained from the source storage device's flash histogram/model of access distribution are first scaled to match the time period (e.g., a week's worth of accesses, a month's worth of accesses) associated with the model of access distribution that has been determined for the destination storage device and then mapped to corresponding buckets/trapezoids in the model of access distribution that has been determined for the destination storage device. The following is one example technique by which to scale and map the added VM's historical accesses to flash and disk to appropriate buckets and trapezoids in the model of access distribution that has been determined for the destination storage device:

The time period represented in a histogram is first computed for both the source storage device and the destination storage device:

Total number of accesses in histogram=total_accesses[$i$]=(target average access count)*(maximum number of allowed bytes in flash)/(physical block size estimate)

For example, the target average access count is 32 and the physical block size estimate may be 4 KB per block.

Sum the read and write accesses over the past week, normalized to 8 KB logical blocks=block_accesses_per_week[$i$]

Time period represented in histogram=history_period_weeks[$i$]=total_accesses[$i$]/block_accesses_per_week[$i$]

Returning to FIG. 12, at 1206, the set of accesses to flash blocks and disk blocks is added into corresponding one or more portions of the first model of access distribution associated with the destination storage device based at least in part on the scaling and mapping to determine a modified model of access distribution associated with the destination storage device.

So, if it is desired to convert a bucket with K accesses on Source Storage Device A, the corresponding bucket on Destination Storage Device B is (K/history_period_weeks[A])*(history_period_weeks[B]).

For example, the history_period week values are 3 and 2, so the conversion factor is ⅔. Blocks in bucket 5 of the source storage device's histogram have access frequencies between [5/N, 6/N), so converted frequency is [3.33N, 4N). All the blocks thus belong in bucket 3 in the destination storage device's histogram.

Suppose in a different example, the VM is being migrated in the opposite direction, so the conversion factor is 3/2. Blocks in Bucket 3 of the source storage device's histogram have converted frequencies between Buckets [4.5/N, 6N). Thus ⅔rds of them are in Bucket 5 in the destination storage device's histogram, but the remaining 3rd are in Bucket 4 in the destination storage device's histogram.

Figure 13:
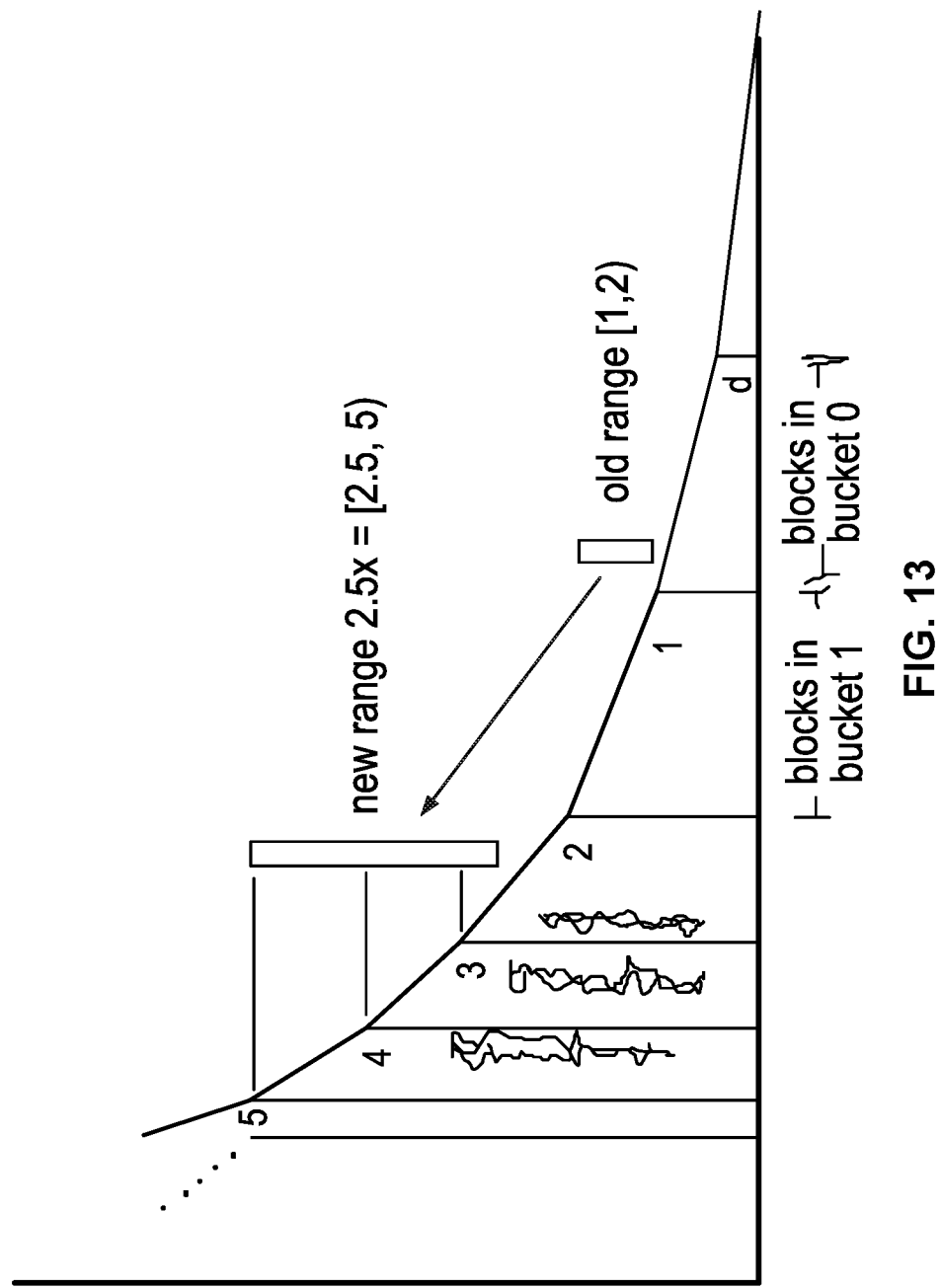
FIG. 13 is a diagram showing an example of mapping accesses associated with a new VM to an existing model of access distribution associated with a destination storage device.

Given a conversion factor of 2.5×, blocks in Bucket 1, that is, [1,2)—would become spread across [2.5,5), as shown in FIG. 13.

Note that Bucket 0 has endpoints [d, 1) and should be treated accordingly, while blocks on disk have endpoints [0, d). In some embodiments, a simplifying assumption that prediction parameter d is the same for all the VMs on the storage device is used, rather than calculating it per-VM.

The number of blocks on disk can be calculated by taking the written size of the VM and subtracting the number of blocks in flash.

The math here is easiest to work in reverse. If [D,E) is the destination bucket, F is the conversion factor, and [S,T) is the source bucket, then:

Number of blocks to add to destination bucket [D,E)=fraction of [S,T) mapped to [D,E)=fraction of [FS,FT) inside [D,E). Case by case:

[FS,FT) is completely contained: number of blocks=bucket[S]

[FS,FT) is completely outside [D,E): number of blocks=bucket[S]*(E-D)/(FT-FS)

FS<D<FT<=E: number of blocks=bucket[S]*(FT-D)/(FT-FS)

D<=FS<E<FT: number of blocks=bucket[S]*(E-FS)/(FT-FS)

Note the general term is =bucket[S] *(min(FT,E)-max(FS,D))/(FT-FS) which satisfies all four cases described above.

Figure 14:
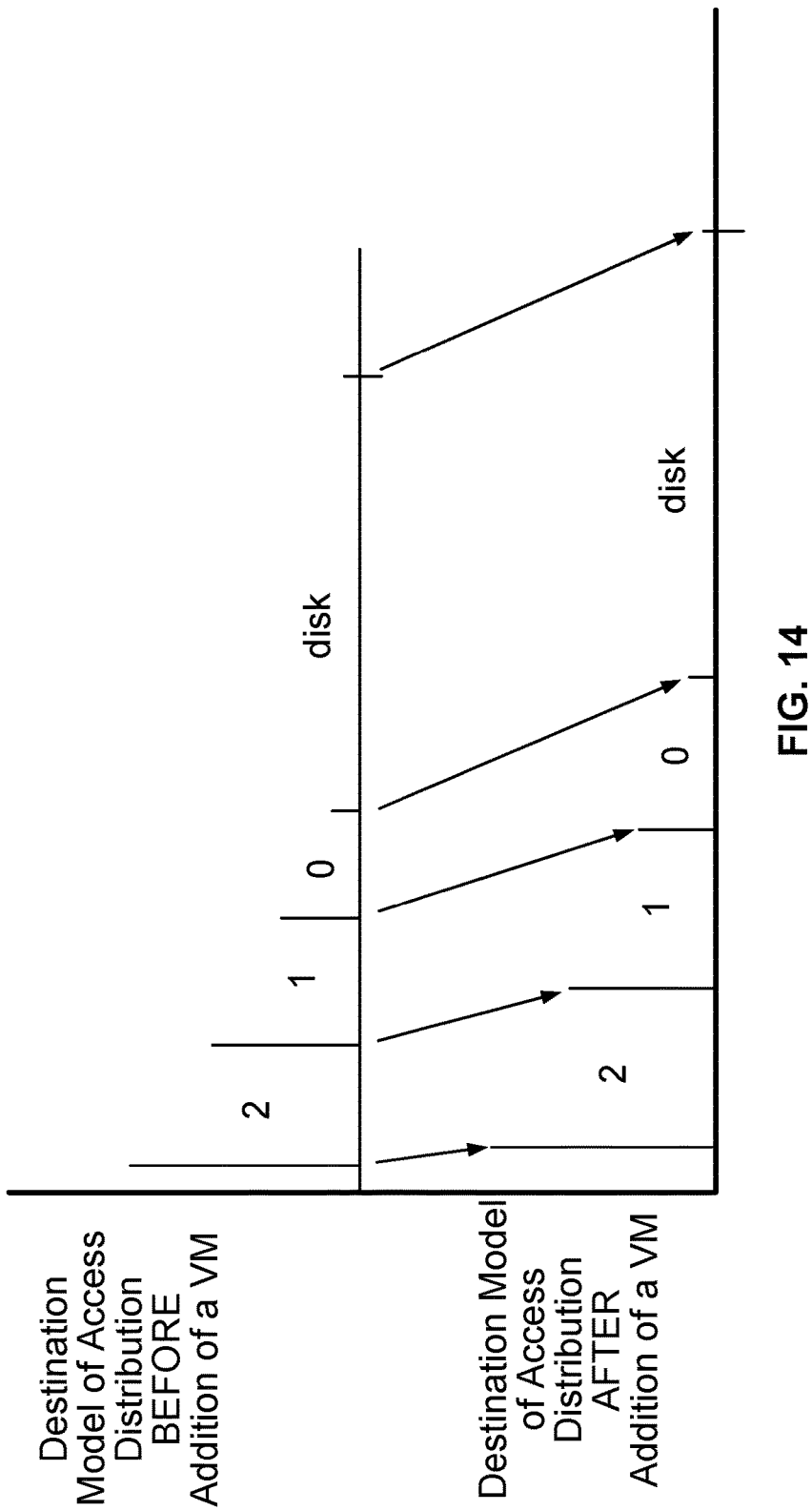
FIG. 14 is a diagram showing a modified model of access distribution associated with a destination storage device.

As a result of performing steps 1204 and 1206, increased block counts occur in a variety of buckets on the destination storage device's histogram, as shown in FIG. 14.

Returning to FIG. 12, at 1208, a predicted flash hit rate associated with the destination storage device is determined based at least in part on the modified model of access distribution associated with the destination storage device and a prediction parameter associated with the destination storage device.

As a result of adding the accesses in flash and disk that correspond to the VM to be added or has already been added, some blocks of data that were previously stored in flash will be evicted into one or more flash trapezoids and moved onto disk, thereby increasing the width of the triangular tail under the curve associated with the model of access distribution (i.e., the number of blocks in disk). Due to the increased number of blocks of data that are stored on disk at the destination storage device, the flash hit rate at the destination storage device after a new VM is added to the destination storage device is expected to degrade (e.g., decrease further from 1). The specific flash hit rate at the storage device after a new VM is added from the destination storage device is predicted using the previously determined prediction parameter d for the storage device, as will be described with the examples of FIGS. 15A and 15B.

Figure 15A:
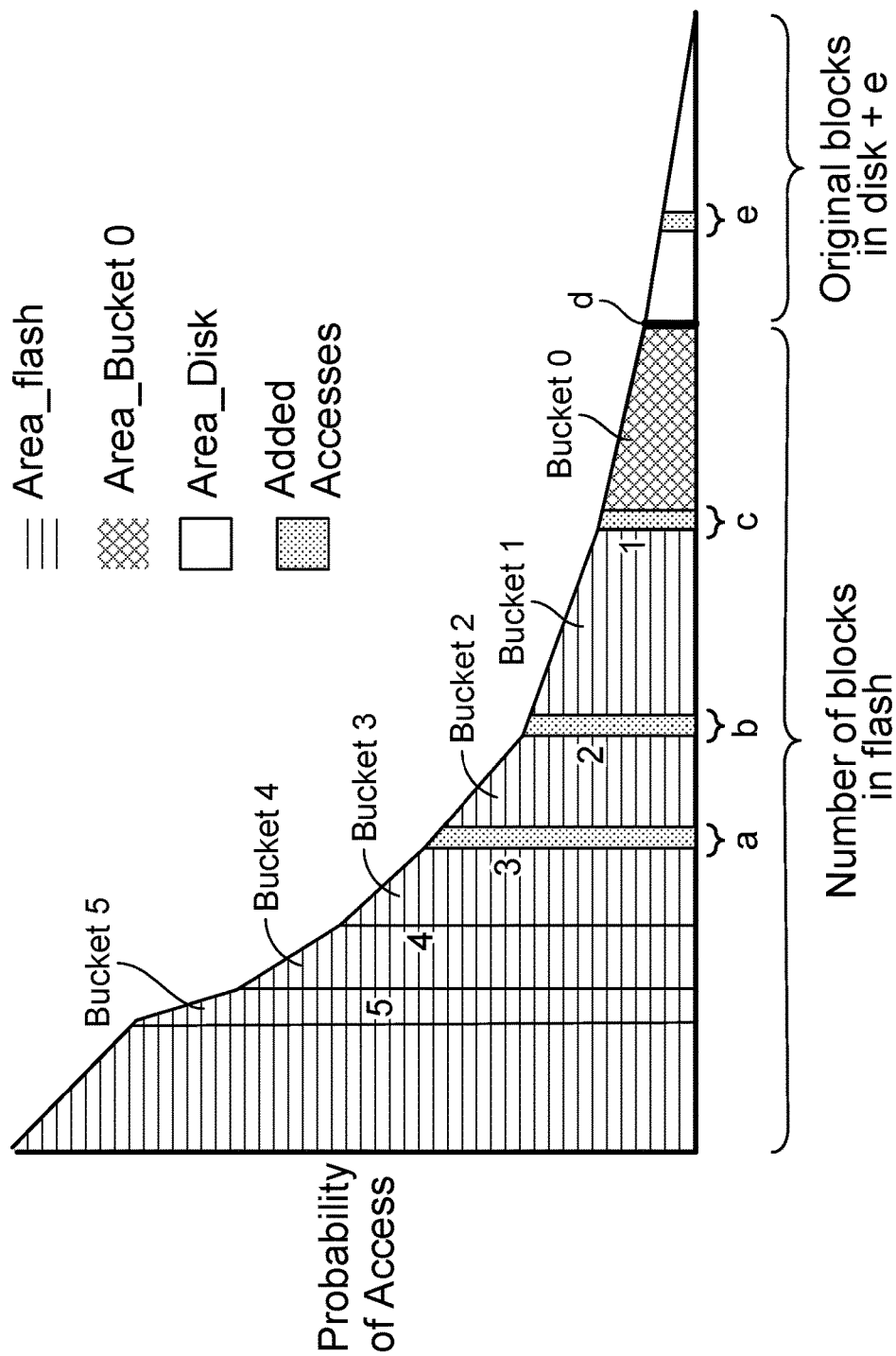
FIG. 15A is a diagram showing an example of modifying a model of access distribution associated with a storage device by adding accesses associated with an added VM.

FIG. 15A is a diagram showing an example of modifying a model of access distribution associated with a storage device by adding accesses associated with an added VM. In the example of FIG. 15A, the historical accesses to flash and disk blocks associated with the new VM have already been scaled and mapped to their appropriate buckets/trapezoids within the model of access distribution that was determined for the destination storage device. The width of each grey band within the trapezoids corresponding to a respective bucket represents the number of accesses to flash blocks within that trapezoid that are associated with the added VM and that are therefore to be added to those respective trapezoids. As such, "a" blocks are added to the trapezoid corresponding to Bucket 3, "b" blocks are added to the trapezoid corresponding to Bucket 2, and "c" blocks are added to the trapezoid corresponding to Bucket 1. Similarly, the width of the grey band within the triangular area in the curve of the model of access distribution represents the number of accesses to disk blocks that are associated with the added VM and that therefore are to be added to the triangular area. As such, "e" blocks are added to the triangular area of the model of access distribution.

Figure 15B:
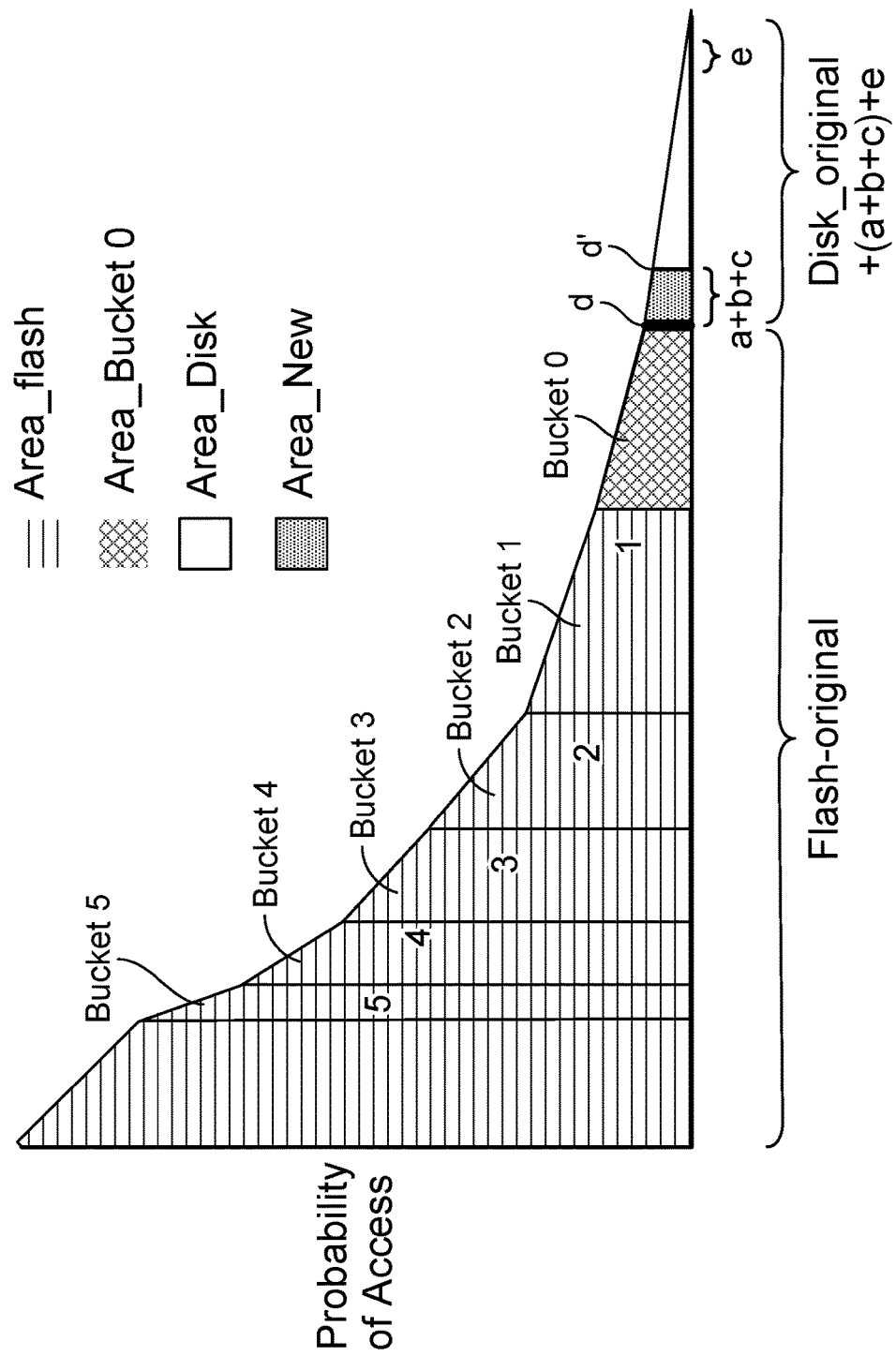
FIG. 15B is a diagram showing an example of a modified model of access distribution associated with a storage device after accesses associated with an added VM have been added.

FIG. 15B is a diagram showing an example of a modified model of access distribution associated with a storage device after accesses associated with an added VM have been added. Continuing the example of FIG. 15A, due to the addition of "a+b+c" blocks of data to flash, the width of each bucket (Buckets 3, 2, and 1) to which accesses to blocks were added is increased. Furthermore, due to the newly created addition of "a+b+c" blocks on flash as a result of the added VM and the assumption that the flash storage is always maximally consumed with data, assuming an equilibrium state of the system, "a+b+c" blocks of data are evicted from flash and stored onto disk. As a result of evicting "a+b+c" blocks from flash onto disk and additionally adding "e" blocks to disk, the width of the triangular area under the curve of the model of access distribution is "a+b+c+e" blocks more than the number of blocks of data that were originally stored on disk (Disk_original).

As mentioned above, the predicted flash hit rate at the storage device after the actual or hypothetical addition of the VM may be determined as the area under the curve of the model of access distribution across all the flash blocks over the sum of the area under the curve of the model of access distribution across all the flash blocks and the new triangular area under the curve of the model of access distribution across all the disk blocks. The area under the curve of the model of access distribution across all the flash blocks may be determined as the sum of all the trapezoidal areas (Area_flash+Area_Bucket 0+Area_New). Example formula (7), as described above, for determining the predicted flash hit rate at the destination storage device is reproduced below:

$$\text{Predicted flash hit rate} = \frac{\text{sum of all trapezoidal areas}}{\text{sum of all trapezoidal areas} + \text{new triangular area}} = \frac{\text{Area\_flash} + \text{Area\_Bucket 0} + \text{Area\_New}}{(\text{Area\_flash} + \text{Area\_Bucket 0} + \text{Area\_New}) + (\text{Area\_Disk})} \quad (7)$$

As mentioned above, the area of a trapezoid corresponding to a bucket is Bucket B=(½)*[Bucket B+(Bucket B+1)]*(number of blocks in Bucket B). Due to the addition of accesses to blocks from Buckets 3, 2, and 1 (as described with FIG. 15A, above), each of the areas of Buckets 3, 2, and 1 are expanded accordingly. The areas in the remaining buckets have not changed. The new trapezoid to the right of the trapezoid corresponding to Bucket 0 is formed as a result of the addition of accesses to Buckets 3, 2, and 1. The area of the new trapezoid (Area_New) can be determined as =(½)*[d+d']*(number of blocks in new trapezoid). The number of blocks in the new trapezoid is "a+b+c," which is the number of blocks that was evicted from flash and onto disk, d (the left side of the new trapezoid) is the prediction parameter that was previously determined for the storage device, and d' (the right side of the new trapezoid) is to be computed. The new triangular area (Area_Disk) can be computed as (½)=d'*(Disk_original+(a+b+c)+e), so d' is also required to be solved to compute Area_Disk.

If the hypotenuse of the new triangular area associated with disk accesses of the modified model of access distribution is assumed to be linear and the new triangular area is assumed to form a right angled triangle, the value of d' can be computed by assuming the constant ratio of the two legs of the right angled triangle. Therefore, the following equation is therefore assumed to be true:

$$\frac{d'}{d} = \frac{\text{Disk\_original} + (a+b+c) + e}{\text{Disk\_original}} \quad (10)$$

Formula (10) may be rewritten to isolate d' as follows:

$$d' = d\left(\frac{\text{Disk\_original} + (a+b+c) + e}{\text{Disk\_original}}\right) \quad (11)$$

Once the value of d' is determined, the area of the new trapezoid (Area_New) can be determined and the new triangular area (Area_Disk) can be computed to determine predicted flash hit rate using formula (11).

A migrated VM's data in flash and disk is removed from the source storage device right away (e.g., as soon as the files are deleted from the source storage device) so the source storage device needs no adjustment for its next prediction. But, the blocks on the destination storage device will take some time to warm up (i.e., receive accesses)—they will all have to start over with access count 1. To prevent the newly migrated data associated with a migrated VM from appearing more cold (i.e., less frequently accessed) than they actually had been at the source storage device, the historical accesses to flash and disk that had been obtained from the source storage device for that migrated VM are incorporated into the model of access distribution associated with the destination storage device that is to be used to make any access rate related load balancing related predicted metrics for the next week (e.g., or some other configured period of time that is to be used as the training period). For every VM that has been moved (e.g., as a result of a load balancing recommendation), the VM's last flash histogram at the source storage device before the move is already known. The VM's most recent flash histogram at the destination storage device (i.e., its current histogram in its new home) is also known. In some embodiments, when performing predictions on the VM destination/current storage device, the VM's current destination flash histogram is subtracted out from the destination/current storage device's current flash histogram (which is the combination of flash histograms across all VMs) and the (properly scaled) last source/previous flash histogram for the VM is used as a replacement. After a week (e.g., or some other configured period of time that is to be used as the training period), the properly scaled flash histogram that was obtained from the source storage device may be dropped and the VM's current flash histogram, which reflects its actual accesses from the past week, may be used in making subsequent access rate related load balancing related predicted metrics at the destination storage device.

In various embodiments, a "clone" refers to a copy of an existing set of data (or the existing set of data is sometimes referred to as "source data"). In various embodiments, a clone is generated from a snapshot of the source data. To generate the clone, a new set of metadata is created and data associating the clone's new set of metadata to the source data's set of metadata is stored such that at least some of the metadata associated with the source data is to be shared with the new set of metadata associated with the clone. Reads to a clone (e.g., VM) that are satisfied by reading the parent's data are recorded in the flash histogram of the parent (e.g., VM). In some embodiments, the following occurs at a source storage device with respect to a VM migration:

Moving a clone VM will remove only the blocks unique to that clone VM from the source storage device's flash histogram.

Moving a parent VM of a clone VM will (pessimally) not reduce working set at all.

In some embodiments, the following occurs at a destination storage device with respect to a VM migration:

Moving a clone VM will (pessimally) add a number of accesses equal to the parent VM as well as the clone VM itself. In some embodiments, the I/O load of each of the clones (and the parent itself) may be evaluated and such accesses may be "split up" proportionally.

Moving a parent VM of a clone VM can be treated like a normal, non-clone VM.

Synthetic VMs may have non-zero histograms since some blocks remain in flash. They can be assumed to occupy no working set (over the long run) on the destination storage device, as long as there are no clones of the VM.

Figure 16:
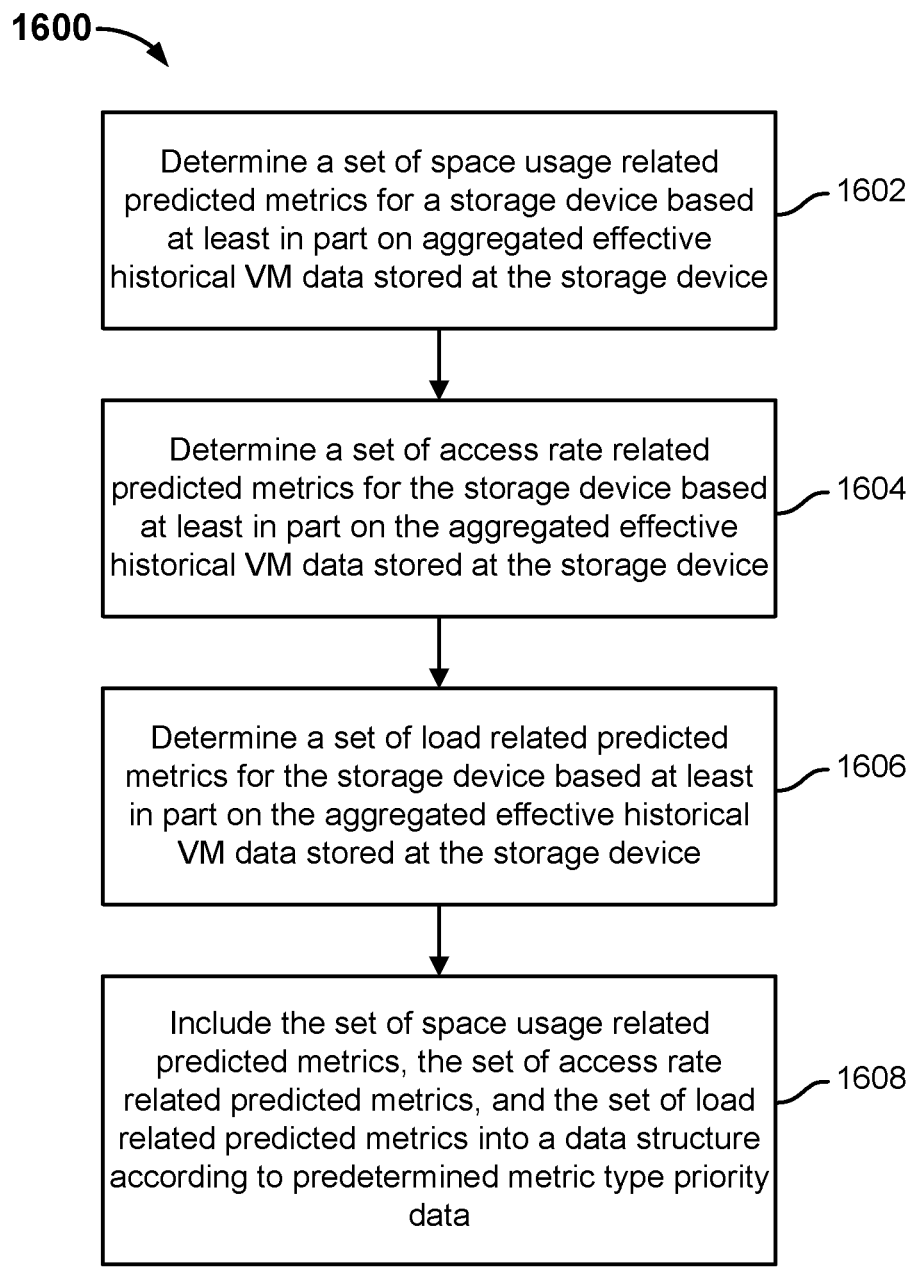
FIG. 16 is a flow diagram showing an embodiment of a process for determining a storage device specific predicted metric data structure.

FIG. 16 is a flow diagram showing an embodiment of a process for determining a storage device specific predicted metric data structure. In some embodiments, process 1600 is implemented by VM load balancing server 112 of system 100 of FIG. 1.

At 1602, a set of space usage related predicted metrics is determined for a storage device based at least in part on aggregated effective historical VM data stored at the storage device.

In various embodiments, the aggregated effective historical aggregated storage capacity (e.g., over the past 30 days or another configured period of time in the past) that was consumed by the one or more VMs that currently store data at a storage device is determined. For example, the historical aggregated storage capacity comprises a data point at each day (e.g., or another predetermined interval), where each data point represents a total amount of storage space that is used by the one or more VMs that store data at the storage device on that particular day.

In some embodiments, the aggregated effective historical storage capacity data is input into one or more statistical models that are configured to produce various predictions, based on the input data, on how much aggregated storage capacity will be consumed by the VMs at the storage device (e.g., at any point during the next seven days or another configured period of time in the future). At least a subset of the predictions will be sorted into a cumulative distribution function and predicted metrics corresponding to various space usage related metric types may be determined. Examples of space usage related metric types are space usage thresholds for which predicted metrics are computed as the percentage of predictions that are above the threshold of a metric type.

Table 1 below includes example thresholds for space usage metric types:

TABLE 1

| Metric Type Name | Space Usage Threshold |
|---|---|
| space_threshold_100 | 100% of storage device physical capacity |
| space_threshold_snapshots | 98% of storage device physical capacity |
| space_threshold_replicas | 95% of storage device physical capacity |
| space_threshold_90 | 90% of storage device physical capacity |
| space_threshold_80 | 80% of storage Device physical capacity |

In some embodiments, the predicted metrics are bounded at 1%. In some embodiments, the predicted metrics are also bounded above at 99% so that the pool metric does not saturate at 1.

In some embodiments, a space usage related predicted metric comprises a single value (a probability). In some embodiments, a space usage related predicted metric comprises a range of values (e.g., a range of probabilities, which is sometimes referred to as a "confidence interval"). For example, the confidence interval may be determined based on a Wilson interval and the computed percentage of predictions that is greater than a space threshold of a metric type. For example, the confidence interval may be determined based on adding to and also subtracting from the computed percentage of predictions that is greater than a space threshold of a metric type.

At 1604, a set of access rate related predicted metrics for the storage device is determined based at least in part on the aggregated effective historical VM data stored at the storage device.

In various embodiments, the aggregated effective historical flash accesses and disk accesses (e.g., over the past seven days or another configured period of time in the past) that were made for requests to the one or more VMs that currently store data at a storage device are determined. For example, the historical aggregated flash accesses and disk accesses comprise a histogram of how many accesses were made to each block in flash and each block in disk (or any block in disk) in the past seven days. In some embodiments, the measured flash hit rate associated with the past seven days may be determined as the number of accesses to flash divided by the sum of the number of accesses to flash plus the number of accesses to disk. In some embodiments, the measured flash miss rate is determined by subtracting the flash hit rate from one (or determining the number of accesses to disk divided by the sum of the number of accesses to flash plus the number of accesses to disk). Examples of access rate related metric types include the greater of the measured flash miss rate and a predetermined flash miss rate (e.g., the maximum function with the measured flash miss rate and a predetermined flash miss rate as arguments).

Table 2 below includes example thresholds for access rate metric types:

TABLE 2

| Metric Type Name | Computation |
|---|---|
| flash_overcommit_97 | max( miss_rate, 0.03 ) |
| flash_overcommit_99 | max( miss_rate, 0.01 ) |
| flash_overcommit_999 | max( miss_rate, 0.001 ) |

At 1606, a set of load related predicted metrics for the storage device is determined based at least in part on the aggregated effective historical VM data stored at the storage device.

In various embodiments, the read and write IOs per second (IOPS) and read and write bytes per second (throughput) are the main historical data that is used to calculate load. In some embodiments, one or more of additional measurements such as average block size, or measures of compressibility and dedupability of the data, can also be used to build a more sophisticated measure of the load placed on each storage device.

The selected inputs are combined into a single "load" measure that nominally ranges from 0 to 100% (though in some cases it could exceed 100%), where 100% is the maximum expected performance of the array.

The metrics based on this measure are "percent of time periods that were over a given load value." Examples of a given load value include 40%, 60%, and 80% load. For example, load_60 metric is max(time periods over 60% load/the number of time periods in training period, 0.01).

At 1608, the set of space usage related predicted metrics, the set of access rate related predicted metrics, and the set of load related predicted metrics are included in a data structure according to predetermined metric type priority data.

In various embodiments, each determined predicted metric (e.g., space usage related, access rate related, and load related) is inserted into a data structure corresponding to the storage device in a manner in which a predicted metric is added to an element of the data structure that reflects the priority associated with the corresponding metric type. For example, the data structure corresponding to the storage device is a vector (e.g., a one-dimensional array), in which case the predicted metric associated with the highest priority metric type may be included in the first element of the vector, and the second highest priority metric type may be included in the second element of the vector, and so forth.

The following are example priorities and related goals, listed from highest to lowest priorities:

1. Space capacity. Ensure that no storage device runs out of space (e.g., prevents the scenario in which a storage device has 100% of its storage capacity consumed). If a message associated with insufficient space capacity is returned to the hypervisor in response to a write to a VM, then the VM experiences an I/O error. Usually, the I/O error will cause the VM to stop functioning and requires an immediate intervention.

2. Data protection. Preserve data protection policies (e.g., replication, snapshot, high-frequency snapshots). In some embodiments, a storage device will cease taking snapshots above a threshold space usage (e.g., 98%) and cease accepting replicas above a lower space threshold (e.g., 95%). If the VM cannot be snapshotted or replicated due to resource constraints, the user may experience data loss at a later date.

3. Guaranteed Quality-of-Service (QoS). Ensure that VMs which have guaranteed QoS can receive the desired minimum normalized IOPS. If a VM experiences high latency due to contention for resources with other VMs, the end user may see application slowdown should the system be oversubscribed. If the storage device user is a service provider, then the service provider's customers are not receiving the guaranteed "floor" that they have paid for. This situation, while requiring attention, typically does not require as high a level of escalation as missed backups or malfunctioning VMs that are associated with a lack of storage space.

4. Best-effort QoS. Attempt to reduce the number of flash misses by analyzing working-set behavior and moving VMs to where there is available flash. VMs that experience high latency but have no QoS protection are still undesirable. The goal is that as long as resources exist somewhere within the pool, no VM should suffer. For example, the VM load balancing server should seek to avoid flash misses.

5. Topology-induced latency. An attempt to eliminate "hot spots" of high IOPS or throughput. Provide consistent performance to VMs. VMs should ideally be placed so that their network connection to the host they are running on is good. For example, it is not desirable to move a VM to a separate rack from its storage.

In various embodiments, each of the above user priorities match up with one or more metric types for which predicted metrics are included in a predicted metric data structure. In some embodiments, user priority 2) corresponds to two different thresholds in a predicted metric data structure: snapshots stopping, and replication stopping. User priority 4) mentions only flash explicitly, but load metrics also seek to satisfy these user requirements, so, in some embodiments, user priority 4) matches 4 metric types in a predicted metric data structure.

In some embodiments, low-priority versions of these metrics (with lower thresholds) are added in a predicted metric data structure to aid in tiebreaking.

In some embodiments, users of a pool of storage devices may be enabled to configure different priorities and/or relative priorities for their pool.

Figure 17:
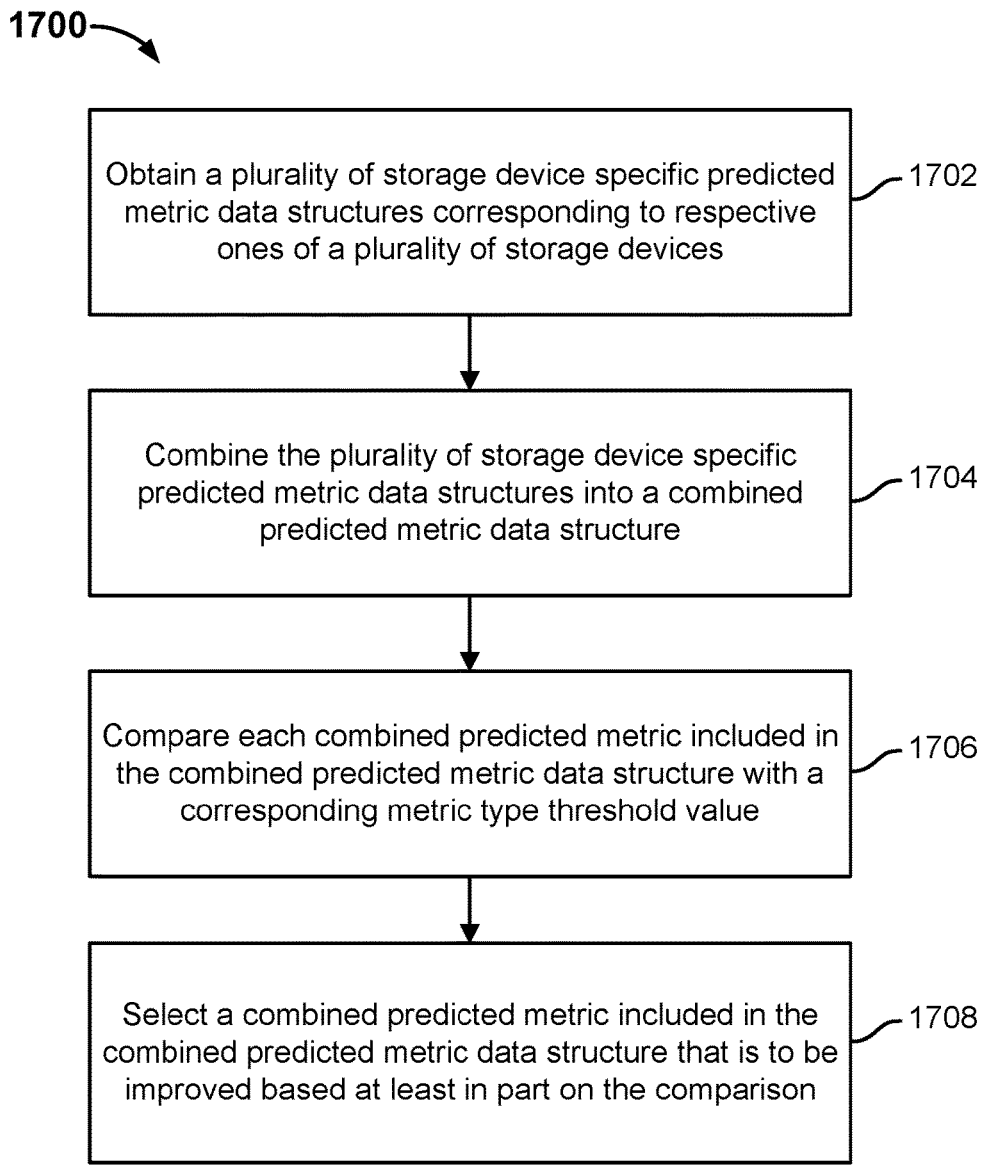
FIG. 17 is a flow diagram showing an embodiment of a process for determining a combined, pool-level predicted data structure.

FIG. 17 is a flow diagram showing an embodiment of a process for determining a combined, pool-level predicted data structure. In some embodiments, process 1700 is implemented by VM load balancing server 112 of system 100 of FIG. 1.

At 1702, a plurality of storage device specific predicted metric data structures corresponding to respective ones of a plurality of storage devices is obtained. In some embodiments, a process such as process 1600 is implemented to obtain a storage device specific predicted metric data structure for each storage device that belongs to a pool of storage devices.

At 1704, the plurality of storage device specific predicted metric data structures is combined into a combined predicted metric data structure. The combined predicted metric across the predicted metrics associated with the same metric type from each storage device specific data structure is the probability that the pool, as a whole, will encounter the undesirable event (e.g., reaching 100% of space usage) associated with the metric type. In various embodiments, the storage device specific predicted metric data structures are combined to form a combined, pool-level predicted metric data structure by determining a joint probability across the predicted metrics associated with the same metric type from each storage device specific data structure.

For example, there are n storage devices in a pool, P1 is the predicted metric (probability) that Storage Device 1's space usage is going to reach 100% storage capacity, P2 is the predicted metric (probability) that Storage Device 2's space usage is going to reach 100% storage capacity, . . . and Pn is the predicted metric (probability) that Storage Device n's space usage is going to reach 100% storage capacity. As such, (1−P1) is the probability that Storage Device 1's space usage is not going to reach 100% storage capacity, (1−P2) is the probability that Storage Device 2's space usage is not going to reach 100% storage capacity, . . . and (1−Pn) is the probability that Storage Device n's space usage is not going to reach 100% storage capacity. Therefore, the joint probability that at least one storage device in the pool's space usage is going to reach 100% storage capacity is:

$$1-(1-P1)(1-P2)\ldots(1-Pn) \quad (1)$$

Formula (1) indicates that a change in even one of the predicted metrics (e.g., if the predicted metric (probability) that a storage device's will reach 100% storage capacity lowers) will improve the combined, pool-level predicted metric.

In the event that a predicted metric comprises a range of probabilities (instead of a single probability value), the joint probability for predicted metrics of storage devices of a pool may be computed as follows: compute a first joint probability of all the upper limits of the predicted metrics and a separate, second joint probability of all the lower limits of the predicted metrics and use the first and second joint probabilities as the endpoints of the combined predicted metric.

In some embodiments, bounding the storage device specific predicted metrics probabilities below 0.99 ensures that the combined, pool-level probability does not saturate at 1.0. For example, in a 10 storage device pool with five storage devices at a threshold and five below the threshold, the calculated value would be:

$$1-(1-0.99)^5(1-0.01)^5=0.99999999990490099501$$

So if a change increases the probability on one of the storage devices to 0.02, there is a detectable difference:

$$1-(1-0.99)^5(1-0.01)^4(1-0.02)$$
$$=0.99999999990586159102$$

That is, even with some storage devices above the threshold, causing others to breach it is still worse.

In some embodiments, each combined predicted metric is stored in the format of 1-ε format, where ε is (1−P1) (1−P2) . . . (1−Pn) to maintain more precision in the combined predicted metric.

At 1706, each combined predicted metric included in the combined predicted metric data structure is compared with a corresponding metric type threshold value.

In various embodiments, each combined predicted metric is compared to a predetermined threshold value corresponding to its metric type. For example, the combined predicted metric for reaching 100% of storage capacity at one or more VMs is compared against the predetermined threshold value for reaching 100% of storage capacity.

An example predetermined threshold value for any of the combined predicted space usage related metric types is 0% because no chance of running out of space is acceptable.

An example predetermined threshold value for any of the combined predicted load related metric types is 1% because some heavy load may be acceptable (e.g., a few hours per week).

A predetermined threshold value may be selected for each of the combined predicted access rate related metric types. For example, the combined 97% flash hit rate metric has a corresponding predetermined threshold of 3% misses, the combined 99% flash hit rate metric has a corresponding predetermined threshold of 1% misses, and the combined 99.9% flash hit rate metric has a corresponding predetermined threshold of 0.1% misses.

The values of predetermined thresholds could be made higher to reduce the number of recommendations, in case they are too noisy or are perceived as only solving lower-probability events.

At 1708, a combined predicted metric included in the combined predicted metric data structure that is to be improved based at least in part on the comparison is selected.

A combined, pool-level predicted metric that exceeds a corresponding predetermined threshold value is determined to be a "problem" metric and one that the VM load balancing server will attempt to improve via recommending one or more VMs to be migrated among storage devices within the pool, as will be described in further detail below.

Figure 18:
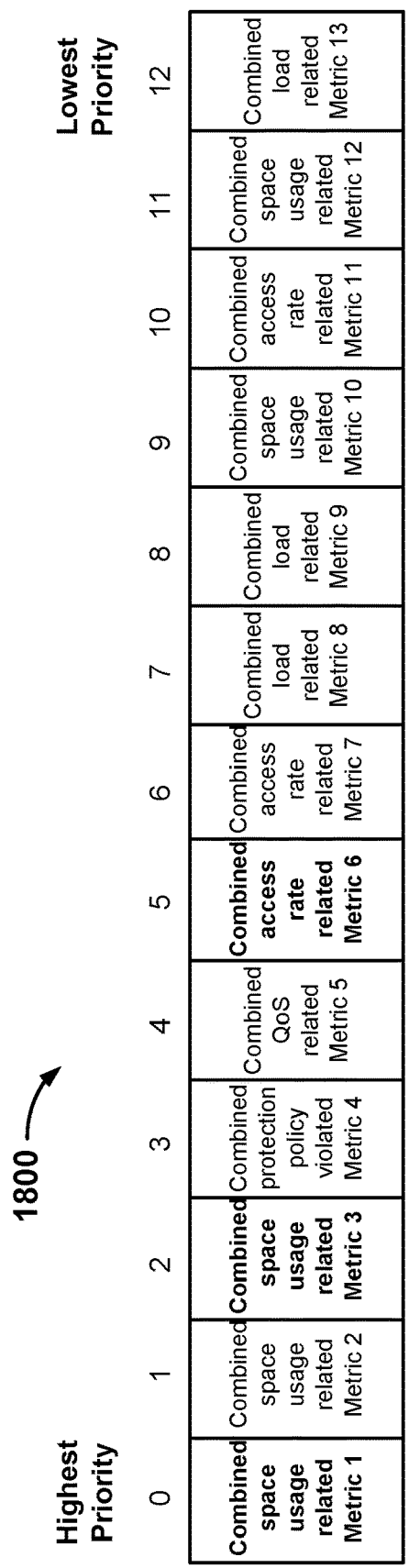
FIG. 18 is a diagram showing a combined predicted metric data structure.

FIG. 18 is a diagram showing a combined predicted metric data structure. In the example of FIG. 18, the combined predicted metric data structure is combined predicted metric vector 1800. Each combined predicted metric of combined predicted metric vector 1800 that is selected to be improved (e.g., having a combined predicted metric that is greater than a corresponding threshold value) is shown in bolded text. As such, in the example of FIG. 1800, the combined space usage related metric 1, combined space usage related metric 3, and combined access rate related metric 6 are each determined to be improved and therefore, selected to be used to determine and recommend which VMs to migrate among storage devices of the pool. An example processing for improving a combined, pool-level predicted data structure is described in FIG. 19, below. In some embodiments, in the event that there are multiple selected combined predicted metrics to be improved, then VMs are selected to be migrated among a pool of storage devices for each selected combined predicted metric, starting with the one corresponding to the metric type of the highest priority and proceeding to each other of the selected combined predicted metrics in the order of their descending priorities.

Figure 19:
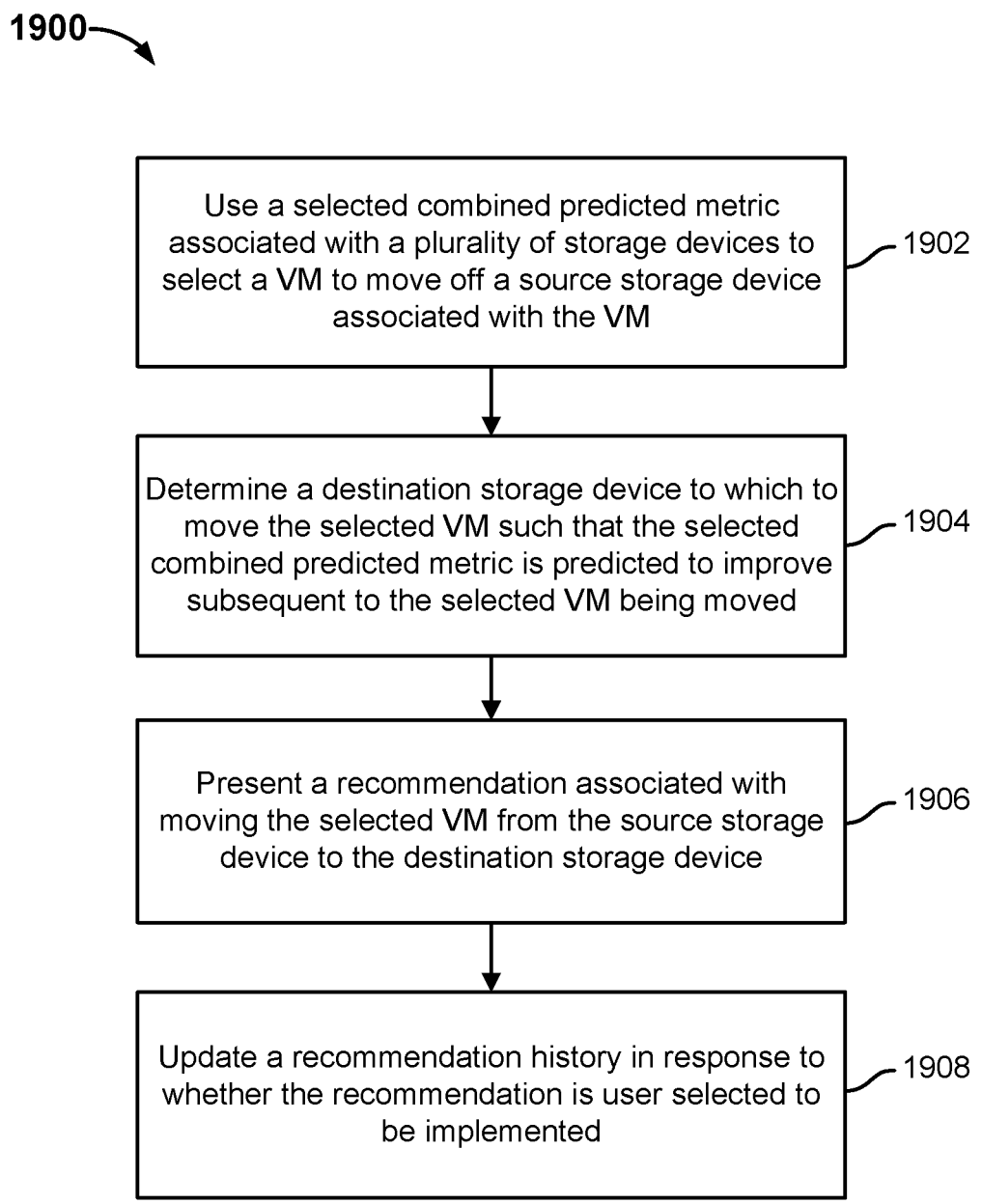
FIG. 19 is a flow diagram showing an example process for determining a combined, pool-level predicted data structure.

FIG. 19 is a flow diagram showing an example process for determining a combined, pool-level predicted data structure. In some embodiments, process 1900 is implemented by VM load balancing server 112 of system 100 of FIG. 1.

In some embodiments, process 1900 is repeated for each selected combined predicted metric.

At 1902, a selected combined predicted metric associated with a plurality of storage devices is used to select a VM to move off a source storage device associated with the VM. A selected combined predicted metric for a pool of storage devices is used to select one or more candidate sets of VMs to move off of their current source storage devices. In some embodiments, a candidate set of VMs to move off their current source storage device(s) is selected for the selected combined predicted metric if it is determined that in a hypothetical (what-if) scenario, that after the candidate set of VMs is moved off their current source storage device(s), the updated combined predicted metric that is computed for the corresponding metric type is improved (e.g., the probability of reaching the undesirable event associated with the metric type is lowered). For example, if the selected combined space usage related metric was a 90% probability that at least one storage device in the pool is going to reach 100% space usage, then a candidate set of VMs may be selected such that if such a set of VMs were removed from their current storage devices (without taking into consideration which destination storage device(s) they would be moved to), the probability that at least one storage device in the pool is going to reach 100% space usage is going to be lower (e.g., by a statistically significant amount) than 90%. An example process of selecting candidate sets of VMs for each selected combined predicted metric is described in FIG. 21, below.

At 1904, a destination storage device to which to move the selected VM is determined such that the selected combined predicted metric is predicted to improve subsequent to the selected VM being moved. In some embodiments, it is determined which destination storage device a set of VMs to which a selected set of VMs is to be migrated based on constraints associated with user assigned rules, constraints associated with storage device attributes, and which destination storage device is predicted to improve the combined predicted metric vector the most, with respect to the metric types of the highest priorities. An example process of determining which destination storage device to move a selected set of VMs is described in FIG. 21, below.

In some embodiments, it is acceptable to make combined predicted metrics lower on the priority list worse in order to improve combined predicted metrics higher on the priority list. In some embodiments, it also acceptable to bound a particular level of service as "good enough" so that items further down the list can be optimized.

In some embodiments, recommendations should take into account the cost of moving VMs both in network traffic and disruption to the users. If an equally good result can be satisfied by moving VMs which are smaller, less I/O-intensive, or powered off, the recommendation generation process should identify the optimal set of VMs to move.

In some embodiments, if the projected costs of moving VMs exceed the potential benefit, no recommendation should be provided.

In some systems, the number of concurrent storage migration operations per storage device is limited, and this limit should be respected. The VM load balancing server should seek to identify VMs that span multiple storage devices and multiple destination storage devices in order to spread load.

In some embodiments, the recommendation modelling should estimate the effects of moving VMs between storage devices which compress for capacity and those which do not, and between flash (which dedupe for capacity) and hybrid models (which do not dedupe for capacity).

Two storage devices may not be anywhere close to a space usage threshold and yet one is more "full" than the other, either in load or capacity. In various embodiments, VM load balancing goals in this case are:

Get "ahead of the game" by using empty storage devices in preference to fuller storage devices. Avoid moving a VM on a storage device only to have to move it off a few weeks later, or leaving an empty storage device unused.

Preserve some open space for initial placement.

Allow moving beyond perfectly balancing space in order to balance load as well.

If one potential target has 25% capacity and 10% load used, and another has 20% capacity and 20% load, then it is noted that the difference in capacity is smaller than the difference in load, so load should dominate.

In some embodiments, a new metric that combines the two measurements may be added to the combined predicted metric data structure. For example, one possible solution is to sum 1/(1-capacity percentage)+1/(1-load percentage) across all storage devices. This prioritizes increasingly low percentages. In some embodiments, combined predicted metrics are ignored and VMs are stochastically distributed in a way that tends to promote balance. In the example above, several VMs may need to be moved but not all of them should be put on the same storage device. Each storage device could instead be assigned a weight based on predicted capacity and load, and in case the combined predicted metric is tied, randomly choose a destination storage device proportional to those weightings.

At 1906, a recommendation associated with moving the selected VM from the source storage device to the destination storage device is presented. A recommendation that identifies at least the selected set of VMs to move, the destination storage device to which to move the set of VMs, and the combined predicted metric (e.g., associated with the highest priority) that is predicted to be improved after the move is generated and presented at a user interface. A user may select to implement the recommendation or ignore the recommendation and/or provide a reason for his or her action.

Any VM selected as part of the recommendation must improve at least one of the selected combined predicted metrics to improve. The combined predicted metrics that were not selected to be improved only inform VM and storage device choice and in some embodiments, these metrics will not be visible to the user.

At 1908, a recommendation history is updated in response to whether the recommend is user selected to be implemented. Whether the recommendation was approved by a user to be implemented is stored in the recommendation and may be used to determine subsequent recommendations.

In some embodiments, the VM load balancing server is configured to self-measure the accuracy and impact of its predictions. If a prediction is made for the expected space consumption, IOPS, or flash usage on a storage device and no load balancing actions are taken, those predictions can be checked (e.g., updated based on newly available historical data) over the next week. If a load-balancing operation is performed based on a prediction of post-migration behavior, then the prediction associated with that load-balancing operation can also be checked. In various embodiments, the results of this self-analysis would feed back to the user in the form of a "confidence level" in subsequent predictions. In some embodiments, some or all of this information is sent back to the user at the user interface, in the form of predictive model output or retrospective analysis of recommendations.

Figure 20:
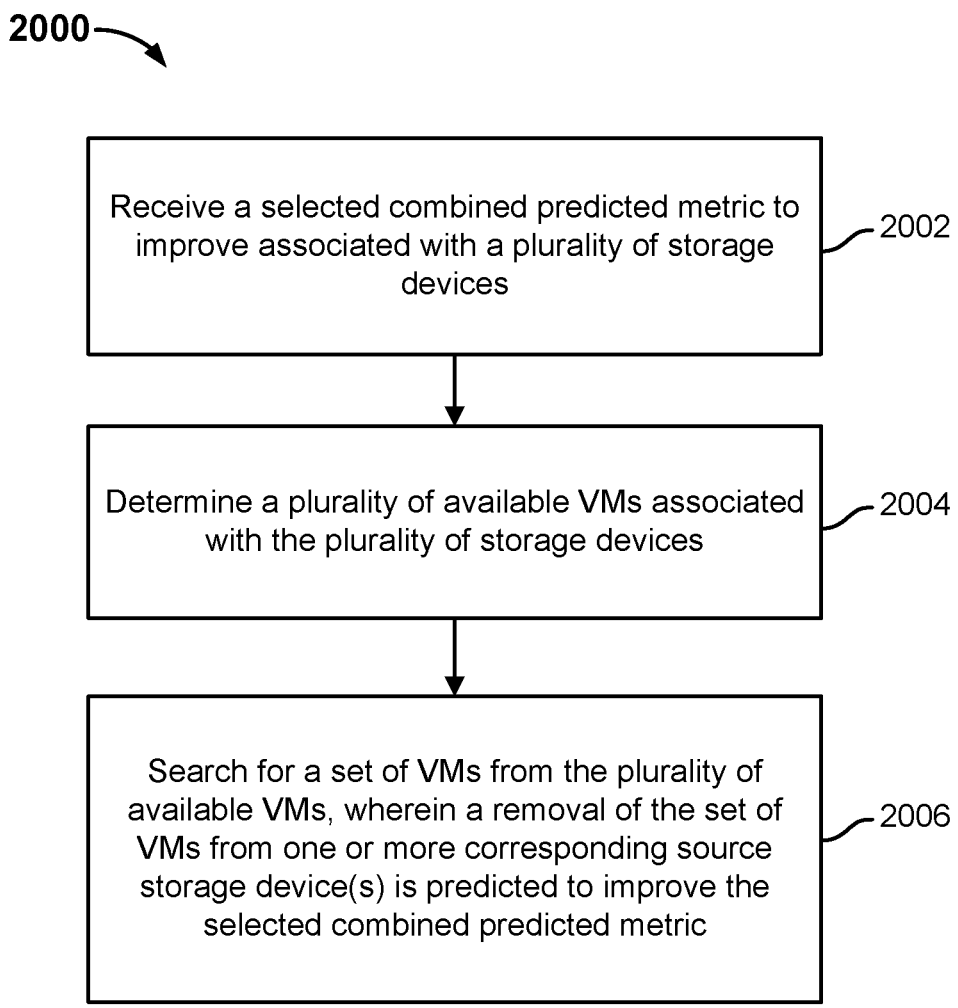
FIG. 20 is a flow diagram showing an example process for selecting a candidate set of VMs to migrate off their source storage devices for a selected combined predicted metric.

FIG. 20 is a flow diagram showing an example process for selecting a candidate set of VMs to migrate off their source storage devices for a selected combined predicted metric. In some embodiments, process 2000 is implemented by VM load balancing server 112 of system 100 of FIG. 1. In some embodiments, step 1902 of process 1900 of FIG. 19 may be implemented at least in part using process 2000.

At 2002, a selected combined predicted metric to improve associated with a plurality of storage devices is received. Process 1200 may be performed for each selected combined predicted metric to improve that is associated with a pool of storage devices. For example, returning to the example of FIG. 10, any one of combined space usage related metric 1, combined space usage related metric 3, and combined access rate related metric 6 may be received at 2002.

At 2004, a plurality of available VMs associated with the plurality of storage devices is determined. In various embodiments, the available VMs of the pool are those VMs that are not restricted from being migrated from their current storage devices. In some embodiments, restrictions on a VM from being migrated from their current storage device include user provided rules, the inclusion of the VM in a previously generated recommendation (e.g., the VM has already been committed to migrate to a determined destination storage device in the previously generated recommendation), and storage device attributes. For example, a user provided rule is that "VM-123" is to always run on Storage Device A or that no VM should be moved from a datastore at one subdirectory to a datastore with a different subdirectory. For example, a previously generated recommendation that was determined for combined predicted space usage related metric 1 includes moving "VM-123" to Storage Device D and as such, "VM-123" is no longer available when determining sets of VMs to migrate for combined predicted space usage related metric 3.

At 2006, a set of VMs from the plurality of available VMs is searched for, wherein a removal of the candidate set of VMs from one or more corresponding source storage device(s) is predicted to improve the selected combined predicted metric. In some embodiments, of the available VMs, sets of one or more VMs are determined such that it in a hypothetical (what-if) scenario in which each VM of a set is removed (i.e., the historical VM data of that VM is removed) from their respective source storage devices, the recomputed combined, pool-level predicted metric data structure will include an updated combined predicted metric associated with the metric type of the selected combined predicted metric that is received at step 2002 that is better than the selected combined predicted metric received at step 2002. Computing the updated combined, pool-level predicted metric data structure may be determined using a process such as process 1700 of FIG. 17. For example, if the selected combined predicted metric is a 90% probability that at least one storage device will reach 100% space usage (e.g., in the next seven days) and it is predicted that if both VMs "VM-123" and "VM-456" are moved off their current storage device (Storage Device B), there will only be a 70% probability that at least one storage device will reach 100% space usage, then VMs "VM-123" and "VM-456" will be determined to be a set of VMs at step 2006.

Figure 21:
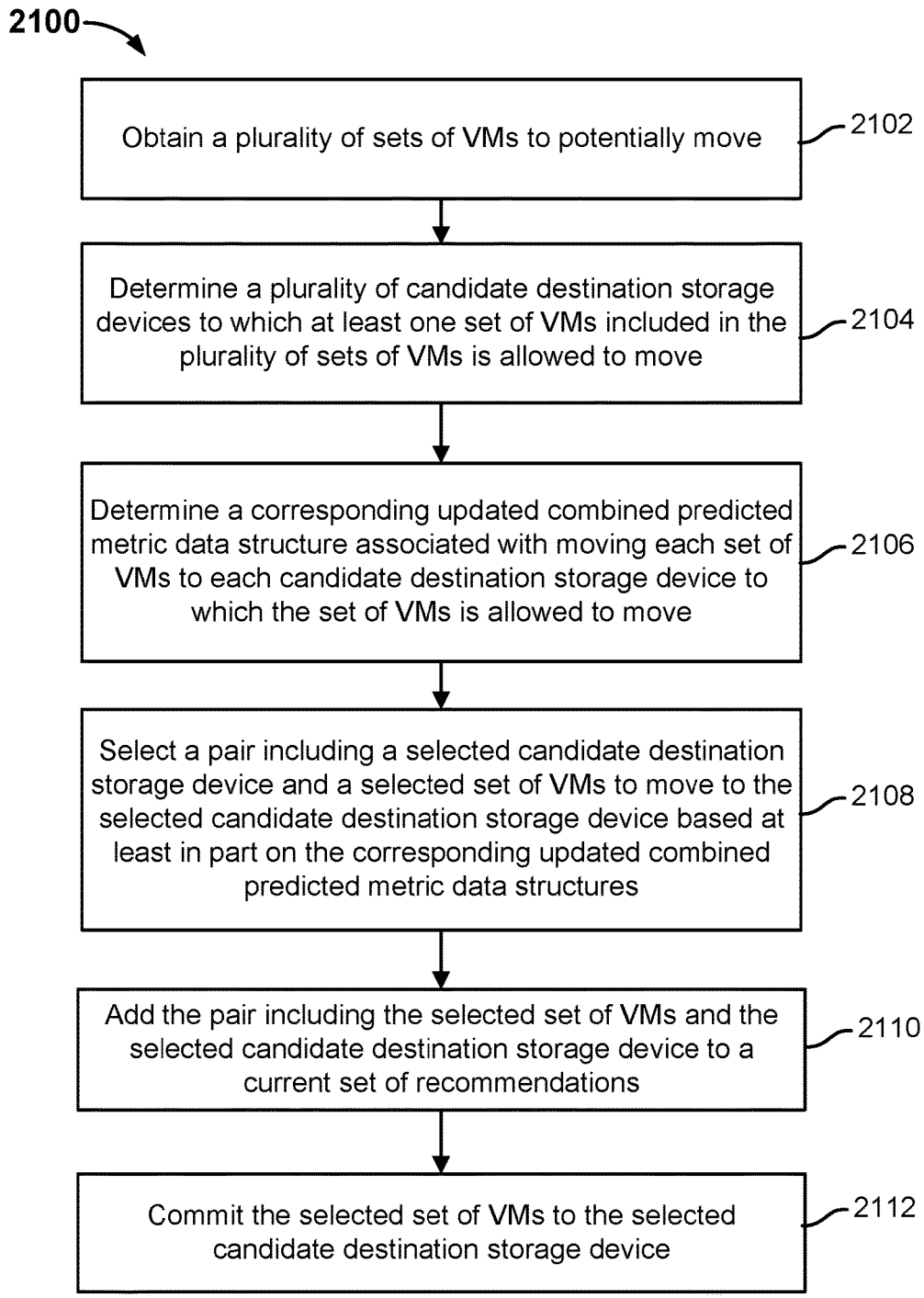
FIG. 21 is a flow diagram showing an example process for selecting a candidate destination storage device to which to recommend moving a set of VMs.

FIG. 21 is a flow diagram showing an example process for selecting a candidate destination storage device to which to recommend moving a set of VMs. In some embodiments, process 2100 is implemented by VM load balancing server 112 of system 100 of FIG. 1. In some embodiments, step 1904 of process 1900 of FIG. 19 may be implemented at least in part using process 2100.

Process 2100 describes an example process of selecting a candidate destination storage device to move a selected set of VMs to, to improve a current, selected combined predicted metric associated with a pool of storage devices. As will be described below, pairs of sets of VMs and candidate destination storage devices are looped over at the same time, and the pair of the set of VMs and the corresponding candidate destination storage device that is associated with the best updated combined predicted metric data structure are selected.

At 2102, a plurality of sets of VMs to potentially move is obtained. In some embodiments, each set of VMs may be determined for the current, selected combined predicted metric by a technique such as step 2006 of process 2000 of FIG. 20.

For example, sets of VMs Set A, Set B, and Set C are generated.

At 2104, a plurality of candidate destination storage devices to which at least one set of VMs included in the plurality of sets of VMs is allowed to move is determined. In various embodiments, a candidate destination storage device comprises a storage device within the pool of storage devices to which all VM of at least one set of VMs is permitted to (e.g., based on stored affinity rules) move. In some embodiments, all of the VMs in a set are to be moved to the same destination storage device.

Returning to the example above, destination candidate storage devices included in the pool of storage devices D1, D2, and D3 are determined because at least one of sets of VMs Set A, Set B, and Set C is permitted to move to each of D1, D2, and D3.

At 2106, a corresponding updated combined predicted metric data structure associated with moving each set of VMs to each candidate destination storage device to which the set of VMs is allowed to move is determined. For each combination or pair of a set of VMs and a candidate destination storage device, a hypothetical (what-if) scenario is generated in which that particular set of VMs is removed from their corresponding source storage devices (e.g., the VMs of the candidate sets may reside on the same or different source storage devices) and then migrated to that particular candidate destination storage device. In each hypothetical (what-if) scenario, the historical data of each VM of that set is removed from their corresponding source storage devices and then added to that particular candidate destination storage device. In each hypothetical (what-if) scenario, an updated combined, pool-level predicted metric data structure is computed for that pair of a set of VMs and a candidate destination storage device based on the hypothetical migration of the set of VMs. Computing the updated combined, pool-level predicted metric data structure may be determined using a process such as process 1700 of FIG. 17.

Returning to the example above, an updated combined, pool-level predicted metric data structure may be determined for each of the following eight pairs of a set of VMs and a candidate destination storage device (that the set of VMs is permitted to move to):

Set A moves to D1
Set A moves to D2
Set A moves to D3
Set B moves to D1
Set B moves to D2
Set B moves to D3
Set C moves to D2 (in this example, Set C is not permitted to move to D1)
Set C moves to D3

At 2108, a pair including a selected candidate destination storage device and a selected set of VMs to move to the selected candidate destination storage device to is selected based at least in part on the corresponding updated combined predicted metric data structures. In various embodiments, the pair of the set of VMs and the corresponding candidate destination storage device that yields the best (e.g., lowest probability) combined predicted metric corresponding to the highest priority is selected as the most desirable pair of selected candidate destination storage device and the selected set of VMs to move that selected candidate destination storage device to be recommended. In the event that there are two or more tied pairs of sets of VMs and corresponding candidate destination storage devices (e.g., candidate destination storage devices for which the respective updated combined predicted metric data structures are tied), then one or more tiebreaker rules may be used to select one of the pairs of a set of VMs and corresponding candidate destination storage devices. For example, a tiebreaker rule may dictate to select the pair of a set of VMs and the corresponding candidate destination storage device that either has the most remaining storage usage and/or the candidate destination storage device for which the least amount of bytes will be required to be moved.

Returning to the example above, of the eight evaluated potential moves of sets of VMs, moving Set B to storage device D2 is determined to yield the updated combined predicted metric data structure that includes the moved improved (best) combined predicted metric associated with the highest priority.

At 2110, the pair including the selected set of VMs and the selected candidate destination storage device is added to a current set of recommendations.

At 2112, the selected set of VMs is committed to the selected candidate destination storage device. Committing the candidate set of VMs to the selected candidate destination storage device includes preventing any VM of the candidate set from being included in a subsequently generated recommendation. As such, in some embodiments, subsequently generated recommendations do not include overlapping VMs as previously generated recommendations.

In some embodiments, a pair of a set of VMs and a corresponding candidate destination storage device cannot be selected if the proposed move makes a higher-priority combined predicted metric worse, even if it improves the current, selected combined predicted metric. In the event that none of the combinations of sets of VMs and corresponding candidate destination storage devices is satisfactory, no recommendation will be made to move any set of VMs to a corresponding candidate destination storage device for the current, selected combined predicted metric to improve.

In some embodiments, only recommendations associated with improving the worst (i.e., highest-priority) of the combined predicted metrics that were selected to be improved are presented to a user, even if the recommendations improve some of the lower priority combined predicted metrics as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  use a first tier type of storage access counts to model an access distribution across a first tier type of storage and a second tier type of storage at a storage device; and
  generate a predicted first tier type of storage hit rate that is predicted to result from moving an existing virtual machine (VM) off of the storage device using access statistical information associated with the existing VM and the access distribution at the storage device, wherein the predicted first tier type of storage hit rate that is predicted to result from moving the existing VM off of the storage device using the access statistical information associated with the existing VM is used to determine whether to migrate the existing VM off the storage device and to another storage device; and
 a memory coupled to the processor and configured to provide the processor with instructions.

2. The system of claim 1, wherein the first tier type of storage comprises flash and the second tier type of storage comprises disk.

3. The system of claim 1, wherein the first tier type of storage access counts comprises access counts to blocks associated with the first tier type of storage that have been measured across a historical training period.

4. The system of claim 1, wherein to use the first tier type of storage access counts to model the access distribution across the first tier type of storage and the second tier type of storage at the storage device comprises to:
 determine a plurality of access probability buckets based at least in part on the first tier type of storage access counts, which the first tier type of storage access counts comprises a plurality of accesses to a plurality of first tier type of storage blocks; and
 perform interpolation between adjacent access probability buckets in the plurality of access probability buckets.

5. The system of claim 1, wherein the processor is further configured to determine a prediction parameter based at least in part on the model of access distribution, wherein the prediction parameter comprises a probability of access associated with a selected block of the second tier type of storage.

6. The system of claim 1, wherein to generate the predicted first tier type of storage hit rate that is predicted from moving the existing VM off of the storage device using the access statistical information associated with the existing VM comprises to:
 remove, from the model of access distribution, a set of accesses to the first tier type of storage and the second tier type of storage that are associated with the existing VM to generate a modified model of access distribution associated with the storage device; and determine the predicted first tier type of storage hit rate based at least in part on the modified model of access distribution and a prediction parameter that was determined using the model of access distribution.

7. The system of claim 1, wherein the predicted first tier type of storage hit rate comprises a first predicted first tier type of storage hit rate, and wherein the processor is further configured to generate a second predicted first tier type of storage hit rate that is predicted from adding a new VM to the storage device using access statistical information associated with the new VM.

8. The system of claim 7, wherein the storage device comprises a destination storage device, wherein the model of access distribution comprises a first model of access distribution, and wherein to generate the second predicted first tier type of storage hit rate that is predicted from adding the new VM to the storage device using the access statistical information associated with the new VM comprises to:

receive a set of accesses to the first tier type of storage and to the second tier type of storage associated with the new VM from a source storage device associated with the new VM;

determine a scaling and mapping between the set of accesses to the first tier type of storage and to the second tier type of storage and the model of access distribution associated with the destination storage device based at least in part on a first attribute associated with the first model of access distribution associated with the destination storage device and a second attribute associated with a second model of access distribution associated with the source storage device;

add the set of accesses to the first tier type of storage and to the second tier type of storage into corresponding one or more portions of the first model of access distribution associated with the destination storage device based at least in part on the scaling and mapping to determine a modified model of access distribution associated with the destination storage device; and determine the second predicted first tier type of storage hit rate based at least in part on the modified model of access distribution associated with the destination storage device and a prediction parameter that was determined using the model of access distribution.

9. The system of claim 8, wherein the first attribute associated with the first model of access distribution associated with the destination storage device comprises a first historical period of time during which measured accesses were used to generate the first model of access distribution associated with the destination storage device.

10. The system of claim 9, wherein the second attribute associated with the second model of access distribution associated with the source storage device comprises a second historical period of time during which measured accesses were used to generate the second model of access distribution associated with the source storage device.

11. A method, comprising:

using a first tier type of storage access counts to model an access distribution across a first tier type of storage and a second tier type of storage at a storage device; and generating, using a processor, a predicted first tier type of storage hit rate that is predicted to result from moving an existing virtual machine (VM) off of the storage device using access statistical information associated with the existing VM and the access distribution at the storage device, wherein the predicted first tier type of storage hit rate that is predicted to result from moving the existing VM off of the storage device using the access statistical information associated with the existing VM is used to determine whether to migrate the existing VM off the storage device and to another storage device.

12. The method of claim 11, wherein using the first tier type of storage access counts to model the access distribution across the first tier type of storage and the second tier type of storage at the storage device comprises:

determining a plurality of access probability buckets based at least in part on the first tier type of storage access counts, which the first tier type of storage access counts comprises a plurality of accesses to a plurality of first tier type of storage blocks; and performing interpolation between adjacent access probability buckets in the plurality of access probability buckets.

13. The method of claim 11, further comprising determining a prediction parameter based at least in part on the model of access distribution, wherein the prediction parameter comprises a probability of access associated with a selected block of the second tier type of storage.

14. The method of claim 11, wherein generating the predicted first tier type of storage hit rate that is predicted from moving the existing VM off of the storage device using the access statistical information associated with the existing VM comprises:

removing, from the model of access distribution, a set of accesses to the first tier type of storage and the second tier type of storage that are associated with the existing VM to generate a modified model of access distribution associated with the storage device; and determining the predicted first tier type of storage hit rate based at least in part on the modified model of access distribution and a prediction parameter that was determined using the model of access distribution.

15. The method of claim 11, wherein the predicted first tier type of storage hit rate comprises a first predicted first tier type of storage hit rate, and further comprising generating a second predicted first tier type of storage hit rate that is predicted from adding a new VM to the storage device using access statistical information associated with the new VM.

16. The method of claim 15, wherein the storage device comprises a destination storage device, wherein the model of access distribution comprises a first model of access distribution, and wherein generating the second predicted first tier type of storage hit rate that is predicted from adding the new VM to the storage device using the access statistical information associated with the new VM comprises:

receiving a set of accesses to the first tier type of storage and to the second tier type of storage associated with the new VM from a source storage device associated with the new VM;

determining a scaling and mapping between the set of accesses to the first tier type of storage and to the second tier type of storage and the model of access distribution associated with the destination storage device based at least in part on a first attribute associated with the first model of access distribution associated with the destination storage device and a second attribute associated with a second model of access distribution associated with the source storage device;

adding the set of accesses to the first tier type of storage and to the second tier type of storage into corresponding one or more portions of the first model of access distribution associated with the destination storage device based at least in part on the scaling and mapping to determine a modified model of access distribution associated with the destination storage device; and determining the second predicted first tier type of storage hit rate based at least in part on the modified model of access distribution associated with the destination storage device and a prediction parameter that was determined using the model of access distribution.

17. The method of claim 16, wherein the first attribute associated with the first model of access distribution associated with the destination storage device comprises a first historical period of time during which measured accesses were used to generate the first model of access distribution associated with the destination storage device.

18. The method of claim 17, wherein the second attribute associated with the second model of access distribution associated with the source storage device comprises a second historical period of time during which measured accesses were used to generate the second model of access distribution associated with the source storage device.

19. A computer program product, the computer program product being embodied in a non-transitory computer readable storage medium and comprising computer executable instructions, which, when implemented by a processor, cause the processor to perform the steps of:

using a first tier type of storage access counts to model an access distribution across a first tier type of storage and a second tier type of storage at a storage device; and generating a predicted first tier type of storage hit rate that is predicted to result from moving an existing virtual machine (VM) off of the storage device using access statistical information associated with the existing VM and the access distribution at the storage device, wherein the predicted first tier type of storage hit rate that is predicted to result from moving the existing VM off of the storage device using the access statistical information associated with the existing VM is used to determine whether to migrate the existing VM off the storage device and to another storage device.

20. A system, comprising:
a processor configured to:
use a first tier type of storage access counts to model an access distribution across a first tier type of storage and a second tier type of storage at a storage device; and generate a predicted first tier type of storage hit rate that is predicted to result from moving an existing virtual machine (VM) off of the storage device using access statistical information associated with the existing VM and the access distribution at the storage device, wherein to generate the predicted first tier type of storage hit rate that is predicted from moving the existing VM off of the storage device using the access statistical information associated with the existing VM comprises to:
remove, from the model of access distribution, a set of accesses to the first tier type of storage and the second tier type of storage that are associated with the existing VM to generate a modified model of access distribution associated with the storage device; and
determine the predicted first tier type of storage hit rate based at least in part on the modified model of access distribution and a prediction parameter that was determined using the model of access distribution; and
a memory coupled to the processor and configured to provide the processor with instructions.

21. A system, comprising:
a processor configured to:
use a first tier type of storage access counts to model an access distribution across a first tier type of storage and a second tier type of storage at a storage device;
generate a first predicted first tier type of storage hit rate that is predicted to result from moving an existing virtual machine (VM) off of the storage device using access statistical information associated with the existing VM and the access distribution at the storage device; and
generate a second predicted first tier type of storage hit rate that is predicted from adding a new VM to the storage device using access statistical information associated with the new VM; and
a memory coupled to the processor and configured to provide the processor with instructions.

* * * * *

UNITED STATES PATENT AND TRADEMARK OFFICE
CERTIFICATE OF CORRECTION

PATENT NO. : 10,489,074 B1
APPLICATION NO. : 15/693245
DATED : November 26, 2019
INVENTOR(S) : Mark G. Gritter and Hong Wang Page 1 of 1

It is certified that error appears in the above-identified patent and that said Letters Patent is hereby corrected as shown below:

In the Specification

In Column 34, Line 11, delete "141-0.99)5 (1-0.01)5 =0.99999999990490099501" and insert --1-(1-0.99)5 (1-0.01)5 =0.99999999990490099501--, therefor.

Signed and Sealed this
Ninth Day of June, 2020

Andrei Iancu
*Director of the United States Patent and Trademark Office*